United States Patent
Lee et al.

(10) Patent No.: US 11,977,981 B2
(45) Date of Patent: May 7, 2024

(54) DEVICE FOR AUTOMATICALLY CAPTURING PHOTO OR VIDEO ABOUT SPECIFIC MOMENT, AND OPERATION METHOD THEREOF

(71) Applicant: SAMSUNG ELECTRONICS CO., LTD., Suwon-si (KR)

(72) Inventors: Gunill Lee, Suwon-si (KR); Jiwon Jeong, Suwon-si (KR); Taehyuk Kwon, Suwon-si (KR); Deokho Kim, Suwon-si (KR); Byeongwook Yoo, Suwon-si (KR); Wonwoo Lee, Suwon-si (KR); Jaewoong Lee, Suwon-si (KR); Sunghoon Yim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 17/481,987

(22) Filed: Sep. 22, 2021

(65) Prior Publication Data
US 2022/0038621 A1    Feb. 3, 2022

Related U.S. Application Data

(63) Continuation of application No. PCT/KR2020/006295, filed on May 13, 2020.

(30) Foreign Application Priority Data

May 17, 2019  (KR) .................. 10-2019-0058310

(51) Int. Cl.
G06N 3/08      (2023.01)
H04N 23/60     (2023.01)
(Continued)

(52) U.S. Cl.
CPC ............. *G06N 3/08* (2013.01); *H04N 23/611* (2023.01); *H04N 23/741* (2023.01); *H04N 23/80* (2023.01); *H04N 23/64* (2023.01)

(58) Field of Classification Search
CPC .......... G06N 3/08; G06N 3/045; G06N 3/044; G06N 3/048; G06N 20/00; G06N 3/04;
(Continued)

(56) References Cited

U.S. PATENT DOCUMENTS 9,124,800 B2   9/2015  Chou et al.
9,357,127 B2   5/2016  Lameer et al.
(Continued)

FOREIGN PATENT DOCUMENTS

CN    110326287 A    10/2019
JP    2007158868 A    6/2007
(Continued)

OTHER PUBLICATIONS

"A Deep Network Solution for Attention and Aesthetics Aware Photo Cropping"; Wenguan Wang, IEEE Transactions On Pattern Analysis and Machine Intelligence, vol. 41, No. 7, Jul. 2019 (Year: 2019).*

(Continued)

*Primary Examiner* — Michael S Osinski
(74) *Attorney, Agent, or Firm* — Sughrue Mion, PLLC

(57) ABSTRACT

A device and method of operating the device for automatically creating photos or videos of a certain moment are provided. The method includes obtaining a plurality of image frames sequentially captured through a camera for a preset time interval; detecting at least one image frame among the plurality of image frames in which a main object corresponding to a preset main object or an action of the main object corresponding to a preset action is recognized; determining a type of composition of the at least one image (Continued)

frame; cropping a region including the main object from the at least one image frame based on placement of objects in the at least one image frame and the determined type of composition; and creating the photo using the cropped region.

13 Claims, 26 Drawing Sheets

(51) Int. Cl.
*H04N 23/611* (2023.01)
*H04N 23/741* (2023.01)
*H04N 23/80* (2023.01)

(58) Field of Classification Search
CPC ........ G06N 3/047; G06N 3/063; G06N 3/049; G06N 7/01; G06N 3/043; G06N 3/084; H04N 23/611; H04N 23/741; H04N 23/80; H04N 23/64; H04N 23/617; H04N 23/632; H04N 23/66; H04N 23/61; G06T 5/00; G06T 5/009; G06T 2207/20132; G06T 2207/20081; G06T 2207/20084; G06T 2207/10016; G06T 7/0002; G06T 2207/30196; G06T 2207/30244; G06T 7/001; G06T 7/70; G06T 2200/24; G06T 2207/30004; G06T 2207/10024; G06T 2207/20021; G06T 2207/20104; G06T 3/0068; G06T 7/10; G06T 7/194; G06T 2207/30168; G06V 20/20; G06V 20/40; G06V 20/41; G06V 20/44; G06V 10/82; G06V 20/52; G06V 20/49; G06V 40/172; G06V 10/764; G06V 40/171; G06V 10/10; G06V 10/25; G06F 1/163; G06F 16/71; G06F 16/735; G06F 16/951; G06F 16/9532
See application file for complete search history.

(56) References Cited

U.S. PATENT DOCUMENTS

| | | | |
|---|---|---|---|
| 9,667,860 B2 | 5/2017 | Hakim et al. | |
| 10,038,836 B2 | 7/2018 | Chen et al. | |
| 10,075,653 B2* | 9/2018 | Jeong | H04N 23/61 |
| 10,284,775 B2 | 5/2019 | Kim et al. | |
| 10,516,830 B2 | 12/2019 | Zhang et al. | |
| 10,715,744 B2* | 7/2020 | Wada | H04N 23/63 |
| 10,939,044 B1* | 3/2021 | Tagra | H04N 23/80 |
| 10,977,509 B2 | 4/2021 | Feng et al. | |
| 11,006,045 B2* | 5/2021 | Lee | G06F 3/0486 |
| 2007/0146528 A1* | 6/2007 | Yanagi | H04N 23/635 |
| | | | 348/E5.045 |
| 2008/0240563 A1* | 10/2008 | Takano | H04N 23/635 |
| | | | 382/173 |
| 2010/0110266 A1* | 5/2010 | Lee | H04N 23/611 |
| | | | 348/333.02 |
| 2011/0043656 A1* | 2/2011 | Tanaka | H04N 23/69 |
| | | | 348/222.1 |
| 2013/0039579 A1* | 2/2013 | Ahn | G06V 40/161 |
| | | | 382/190 |
| 2013/0188866 A1* | 7/2013 | Obrador | G06V 20/10 |
| | | | 382/165 |
| 2013/0208127 A1 | 8/2013 | Chou et al. | |
| 2014/0204244 A1* | 7/2014 | Choi | H04N 23/64 |
| | | | 348/333.05 |
| 2015/0017598 A1 | 1/2015 | Wu et al. | |
| 2015/0116350 A1* | 4/2015 | Lin | G06N 20/10 |
| | | | 345/620 |
| 2015/0271405 A1 | 9/2015 | Lameer et al. | |
| 2016/0006945 A1* | 1/2016 | Furuhashi | H04N 23/633 |
| | | | 348/239 |
| 2016/0054903 A1* | 2/2016 | Jeong | H04N 23/61 |
| | | | 345/661 |
| 2016/0078904 A1* | 3/2016 | Yamaji | G11B 27/005 |
| | | | 382/103 |
| 2016/0080705 A1 | 3/2016 | Jain et al. | |
| 2016/0219217 A1* | 7/2016 | Williams | H04N 23/80 |
| 2017/0118413 A1* | 4/2017 | Shin | H04N 23/62 |
| 2018/0181827 A1 | 6/2018 | Kim et al. | |
| 2018/0182215 A1 | 6/2018 | Jen | |
| 2018/0249083 A1 | 8/2018 | Chi et al. | |
| 2019/0095716 A1* | 3/2019 | Shrestha | G08B 21/187 |
| 2019/0108640 A1* | 4/2019 | Zhang | G06N 3/084 |
| 2019/0130192 A1* | 5/2019 | Kauffmann | G11B 27/031 |
| 2019/0182423 A1* | 6/2019 | Gummadi | H04N 23/62 |
| 2019/0354802 A1* | 11/2019 | Lin | G06F 18/22 |
| 2020/0092465 A1* | 3/2020 | Lee | G06N 3/08 |
| 2020/0097760 A1* | 3/2020 | Nakamori | G06F 18/22 |
| 2020/0125880 A1* | 4/2020 | Wang | G06V 10/449 |
| 2020/0137298 A1* | 4/2020 | Eslami | H04N 23/632 |
| 2020/0250487 A1* | 8/2020 | Song | G06F 18/217 |
| 2020/0293807 A1* | 9/2020 | Ghobadzadeh | G06N 3/084 |
| 2020/0356718 A1* | 11/2020 | Chu | G06N 3/08 |
| 2020/0364832 A1 | 11/2020 | Hu et al. | |
| 2020/0364914 A1* | 11/2020 | Mech | G06T 7/33 |
| 2020/0412942 A1* | 12/2020 | Chen | G06F 18/214 |
| 2021/0201445 A1* | 7/2021 | Kang | G06T 3/60 |
| 2021/0303911 A1* | 9/2021 | Li | G06V 10/82 |
| 2021/0303968 A1* | 9/2021 | Donsbach | G06N 3/045 |
| 2022/0122344 A1* | 4/2022 | Liu | G06V 10/751 |

FOREIGN PATENT DOCUMENTS

| | | |
|---|---|---|
| JP | 201045518 A | 2/2010 |
| KR | 101436326 B1 | 9/2014 |
| KR | 1020150090456 A | 8/2015 |
| KR | 1020160119221 A | 10/2016 |
| KR | 10-2017-0009069 A | 1/2017 |
| KR | 101898888 B1 | 9/2018 |
| KR | 10-2018-0109665 A | 10/2018 |
| KR | 1020190044761 A | 5/2019 |
| KR | 101993001 B1 | 6/2019 |

OTHER PUBLICATIONS

Murray, N., et al., "AVA: A Large-Scale Database for Aesthetic Visual Analysis", Computer Vision and Pattern Recognition, 2012, 8 pages.
International Search Report (PCT/ISA/210) dated Aug. 11, 2020 issued by the International Searching Authority in International Application No. PCT/KR2020/006295.
Communication dated Nov. 16, 2023, issued by the Korean Intellectual Property Office in Korean Patent Application No. 10-2019-0058310.

* cited by examiner

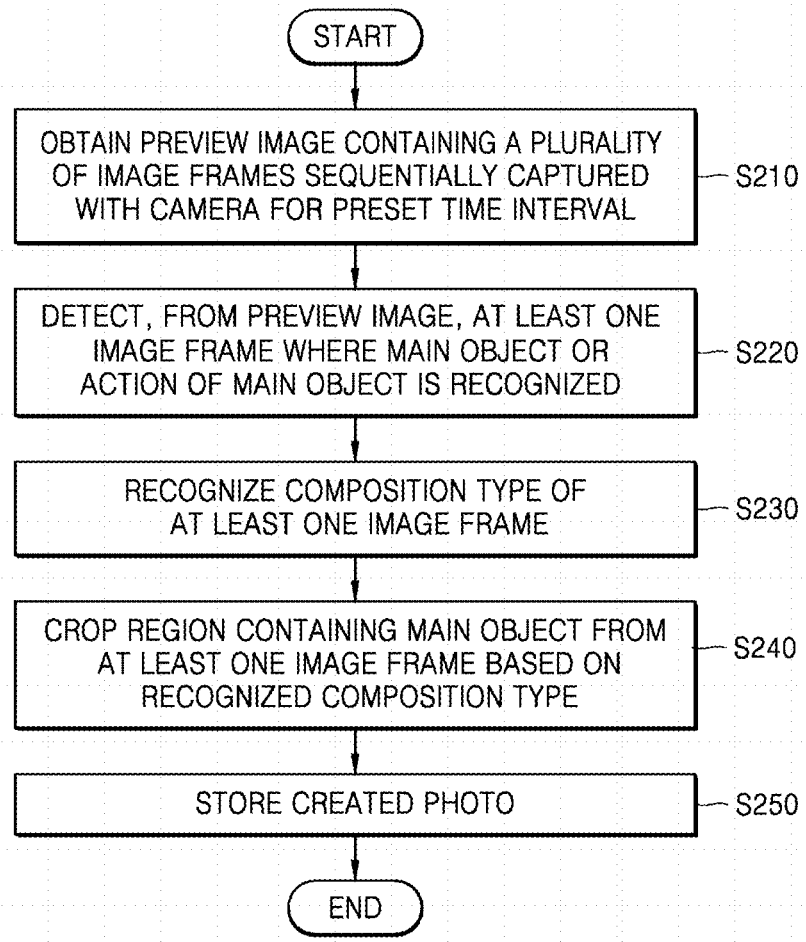

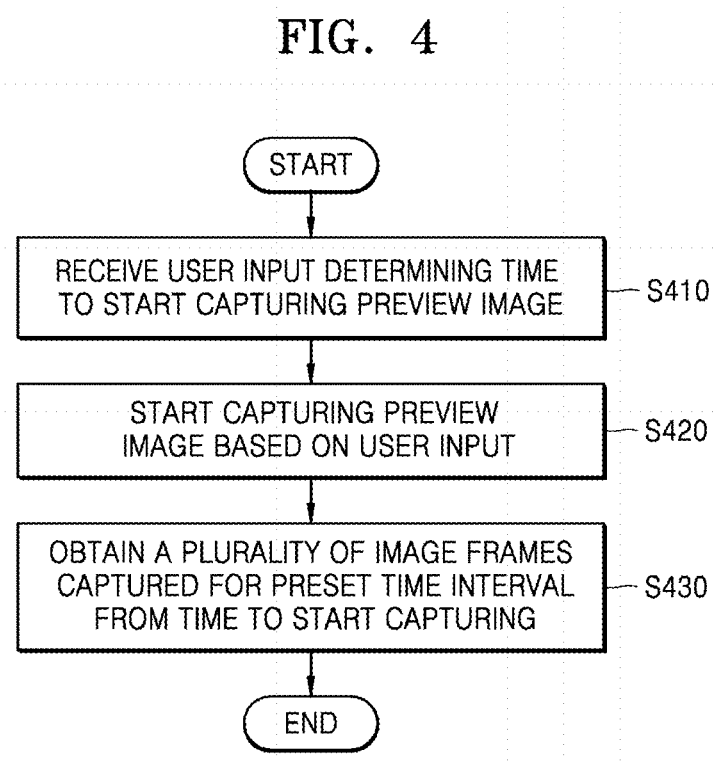

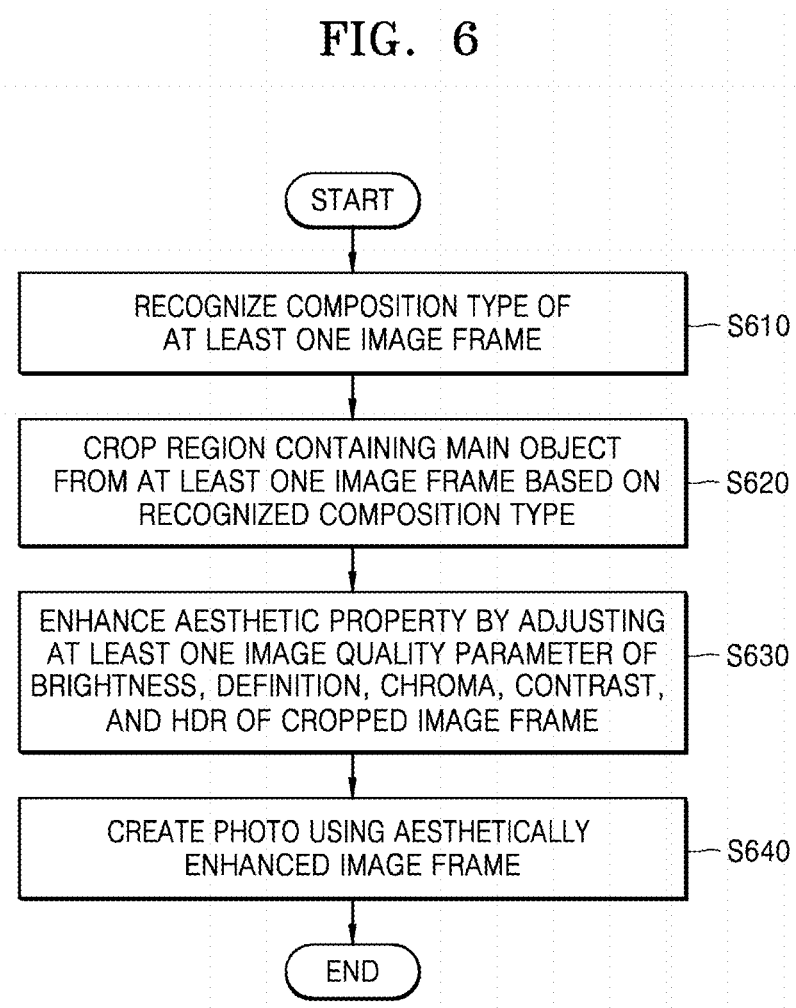

DEVICE FOR AUTOMATICALLY CAPTURING PHOTO OR VIDEO ABOUT SPECIFIC MOMENT, AND OPERATION METHOD THEREOF

CROSS-REFERENCE TO RELATED APPLICATION(S)

This application is a by-pass continuation of International Patent Application No. PCT/KR2020/006295 filed on May 13, 2020, that claims priority from Korean Patent Application No. 10-2019-0058310 filed on May 17, 2019 in the Korean Intellectual Property Office, the disclosures of which are incorporated by reference herein in their entireties.

BACKGROUND

1. Field

The disclosure relates to a device and a method of operating the device for processing an image captured through a camera to automatically create a photo or video of a certain moment and store the photo or video.

2. Description of Related Art

Augmented reality (AR) is a technology that presents an image with three dimensional (3D) virtual images overlapped on a real world image or background, and smart glass employing the AR technology can be practically used in our daily lives, for example, information search, directions, camera shooting, or the like. The smart glass can be also worn as a fashion item and used for outdoor activities.

Devices such as a smart glass, a wearable camera, etc., are able to capture photos or videos in first person viewpoint, and are widely used these days. There is a need for a user to capture a photo or video of a meaningful moment that the user does not want to miss and share it on a social network site (SNS) while wearing the device. However, it is difficult to clearly define such a meaningful moment that the user does not want to miss, because of subjectivity and diversity of individual minds. While the AR device is worn by the user, constant shaking due to walking of the user and sudden turns occurring when the user looks around in unfamiliar surroundings may cause the captured picture or video to be blurry, shaky, or unaligned.

Furthermore, unlike smartphones, the wearable AR device is unable to take high quality photos or videos that the user wants because the wearable AR device does not allow the user to check a preview image or capture an image of a subject in a camera-ready posture.

SUMMARY

Provided are a device and a method of operating the device for automatically creating photos or videos of a certain moment that the user does not want to miss from a plurality of image frames sequentially captured through a camera attached to the device and storing the photos or videos.

Also provided are a device and a method of operating the device for creating photos at expert-level quality by enhancing the composition and aesthetic properties of a plurality of image frames captured through a camera.

Also provided are a device and method of operating the device for creating a video including an action of a main object from a plurality of image frames captured through a camera.

Additional aspects, features, and advantages of the disclosure will be set forth in part in the description which follows and, in part, will be apparent from the description, or may be learned by practice of the disclosure.

In accordance with an aspect of the disclosure, there is provided a method of automatically obtaining a photo of a moment. The method includes: obtaining a plurality of image frames sequentially captured through a camera for a preset time interval; detecting at least one image frame among the plurality of image frames in which a main object corresponding to a preset main object or an action of the main object corresponding to a preset action is recognized; determining a type of composition of the at least one image frame; cropping a region including the main object from the at least one image frame based on placement of objects in the at least one image frame and the determined type of composition; and obtaining the photo using the cropped region.

The obtaining the photo includes: adjusting a cropped image frame including the cropped region based on at least one of image quality parameters including brightness, definition, chroma, contrast, or high dynamic range (HDR).

The determining the type of composition of the at least one image frame includes determining the type of composition of the at least one image frame by using a first neural network model obtained by training a first deep neural network (DNN) with an input of a plurality of photos to output label values of types of composition.

The obtaining the photo further includes predicting an aesthetic estimation score of the cropped image frame, and the adjusting the cropped image frame based on the at least one of image quality parameters further comprises adjusting the cropped image frame based on the predicted aesthetic estimation score.

The predicting the aesthetic estimation score includes predicting the aesthetic estimation score of the cropped image frame by using a second neural network model obtained by training through a second DNN with a plurality of photos as input and normalized values of aesthetic scores estimated in advance for the plurality of photos as output.

The adjusting the cropped image frame based on the at least one of image quality parameters further includes adjusting by using a third neural network model obtained by training a model parameter which indicates a loss between an original photo and the adjusted image frame.

The method of claim 1, further includes: displaying the obtained photo, wherein the display of the photo includes displaying at least one user interface of a guideline of a composition, a histogram of types of composition, or an aesthetic prediction score by overlaying the at least one user interface on the photo.

In accordance with an aspect of the disclosure, there is provided a device for automatically generating a photo of a moment. The device includes: a camera configured to sequentially capture a plurality of image frames of a subject for a preset time interval; a storage storing the plurality of image frames; a memory storing a program including one or more instructions; and a processor configured to execute the one or more instructions of the program stored in the memory to: detect at least one image frame among the plurality of image frames in which a main object corresponding to a preset main object or an action of the main object corresponding to a preset action is recognized; determine a type of composition of the at least one image frame; crop a region including the main object from the at least one image frame based on placement of objects in the at least one image frame and the determined type of composition;

obtain the photo using the cropped region; and store the obtained photo in the storage.

The processor is further configured to adjust a cropped image frame including the cropped region based on at least one of image quality parameters including brightness, definition, chroma, contrast, or high dynamic range (HDR).

The processor is further configured to determine the type of composition of the at least one image frame by using a first neural network model obtained by training through a first deep neural network (DNN) with an input of a plurality of photos to output label values of types of composition.

The processor is further configured to predict an aesthetic estimation score of the cropped image frame, and adjust the at least one of image quality parameters of the cropped image frame based on the predicted aesthetic estimation score.

The processor is further configured to predict the aesthetic estimation score of the cropped image frame by using a second neural network model obtained by training through a second DNN with a plurality of photos as input and normalized values of aesthetic scores estimated in advance for the plurality of photos as output.

The processor is further configured to adjust the at least one of image quality parameters of the cropped image frame by using a third neural network model obtained by training a model parameter which indicates a loss between an original photo and the adjusted image frame.

The device further includes: a display configured to display the obtained photo, wherein the processor is further configured to control the display to display at least one user interface of a guideline of a composition, a histogram of types of composition, or an aesthetic prediction score by overlaying the at least one user interface on the photo.

In accordance with an aspect of the disclosure, there is provided a non-transitory computer-readable storage medium storing a computer program, the computer program, when executed by a processor, causes the processor to: obtain a plurality of image frames sequentially captured through a camera for a preset time interval; detect at least one image frame among the plurality of image frames in which a main object corresponding to a preset main object or an action of the main object corresponding to a preset action is recognized; determine a type of composition of the at least one image frame; crop a region including the main object from the at least one image frame based on placement of objects in the at least one image frame and the determined type of composition; and obtain a photo using the cropped region.

BRIEF DESCRIPTION OF THE DRAWINGS

The above and other aspects, features and advantages of certain embodiments of the disclosure will be more apparent from the following description, taken in conjunction with the accompanying drawings, in which:

FIG. 2 is a flowchart illustrating a method of automatically capturing a picture or a video of a certain moment according to an embodiment;

FIG. 4 is a flowchart illustrating a method of setting a time to start capturing according to an embodiment;

FIG. 6 is a flowchart illustrating a method of obtaining an expert level photo by enhancing the composition and aesthetic properties of at least one image frame, according to an embodiment;

DETAILED DESCRIPTION

The terms are selected from among common terms widely used at present, taking into account principles of the disclosure, which may however depend on intentions of those of ordinary skill in the art, judicial precedents, emergence of new technologies, and the like. Some terms as used herein are selected at the applicant's discretion, in which case, the terms will be explained later in detail in connection with embodiments of the disclosure. Therefore, the terms should be defined based on their meanings and descriptions throughout the disclosure.

As used herein, the singular forms "a", "an" and "the" may include the plural forms as well, unless the context clearly indicates otherwise. All terms including technical and scientific terms used herein have the same meaning as commonly understood by one of ordinary skill in the art to which this disclosure belongs.

The term "include (or including)" or "comprise (or comprising)" is inclusive or open-ended and does not exclude additional, unrecited elements or method steps. The terms "unit", "module", "block", etc., as used herein each represent a unit for handling at least one function or operation, and may be implemented in hardware, software, or a combination thereof.

The expression "configured to" as used herein may be interchangeably used with "suitable for", "having the capacity to", "designed to", "adapted to", "made to", or "capable of" according to the given situation. The expression "configured to" may not necessarily mean "specifically designed to" in terms of hardware. For example, in some situations, an expression "a system configured to do something" may refer to "an entity able to do something in cooperation with" another device or parts. For example, "a processor configured to perform A, B and C functions" may refer to a dedicated processor, e.g., an embedded processor for performing A, B and C functions, or a general purpose processor, e.g., a Central Processing Unit (CPU) or an application processor that may perform A, B and C functions by executing one or more software programs stored in a memory.

The expressions "at least one of a, b or c" indicates only a, only b, only c, both a and b, both a and c, both b and c, or all of a, b and c.

The expressions "first", "second" and the like used in the disclosure may be used to describe various elements regardless of any order and/or degree of importance. In addition, such expressions are used only to distinguish one element from another element.

Embodiments of the disclosure will now be described, by example, in detail with reference to the accompanying drawings to be readily practiced by those of ordinary skill in the art. However, the embodiments of the disclosure may be implemented in many different forms, and not limited thereto as will be discussed herein.

Embodiments of the disclosure will now be described in detail with reference to the accompanying drawings.

Figure 1:
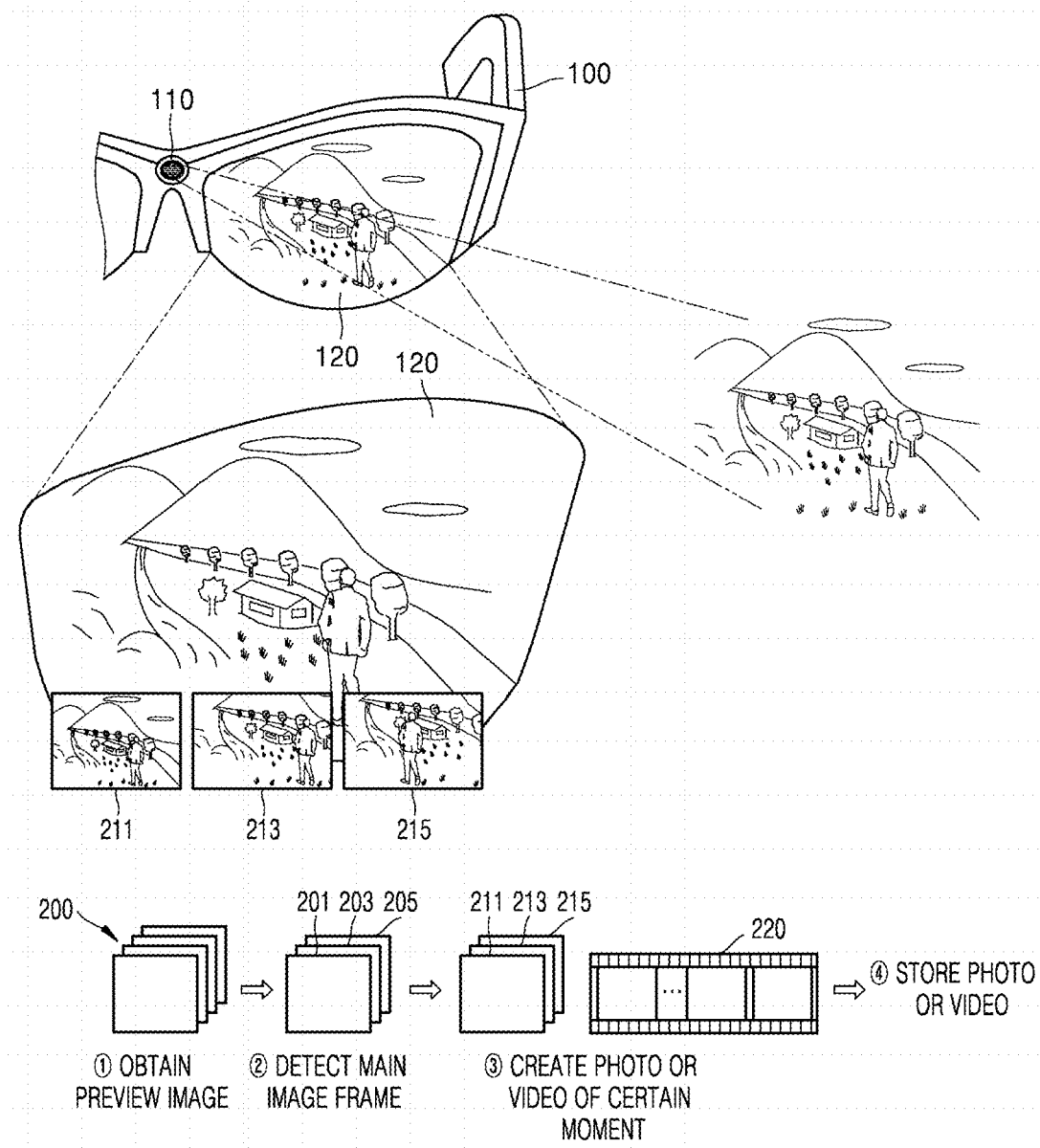
FIG. 1 is a conceptual diagram illustrating a device that captures a subject through a camera to obtain a photo or a video of a certain moment and stores the photo or the video, according to an embodiment.

FIG. 1 is a conceptual diagram illustrating a device 100 that captures a subject through a camera 110 to obtain a photo or a video of a certain moment and stores the photo or the video, according to an embodiment.

Referring to FIG. 1, the device 100 may be a wearable device such as smart glass, but is not limited thereto. The device 100 may include, for example, at least one of a smartphone, a tablet personal computer (PC), a mobile phone, a video phone, an action camera, a wearable camera, and a robot.

The device 100 may include the camera 110. The camera 110 may include a lens that captures a subject, and a camera module including an image sensor that outputs input RGB preview image data of the subject. The camera 110 may include a single camera or multiple cameras.

When the device 100 is smart glass, the camera 110 may be arranged in the center of binocular lenses of the smart glass, without being limited thereto. The camera 110 may be arranged on a side of one of the binocular lenses of the smart glass, or on a portion of the glass leg.

The device 100 may sequentially take pictures of a subject for a preset time period with the camera 110, to obtain a preview image 200 including a plurality of image frames of the subject (operation ①). In an embodiment, the camera 110 may capture a scene viewed from a first person viewpoint of the user, e.g., objects such as people, things, or buildings, background, landscapes, etc., and obtain a plurality of consecutive image frames in a time sequence. In an embodiment, the device 100 may perform image pre-processing tasks such as blur reduction, noise cancellation, image stabilization, or shake removal on the obtained plurality of image frames.

The device 100 may detect main image frames 201, 203, and 205 from among the obtained preview image 200 (operation ②). The expression 'main image frames 201, 203, and 205 may refer to image frames including a preset main object (e.g., family, pets, etc.), or a main action of the object (e.g., jumping, playing football, smiling, etc.). In an embodiment, the device 100 may predefine the main object or the main action of the object, and detect at least one main frame 201, 203, or 205 in which the predefined main object or main action of the object is recognized, from among the plurality of image frames included in the preview image 200. In an embodiment, the device 100 may recognize the main object or the main action of the object in each image frame by training using an artificial neural.

The device 100 automatically obtains photos 211, 213, and 215 or a video 220 of a certain moment from the at least one detected main image frame 201, 203, and 205 by image processing (operation ③). The device 100 may obtain the photo 211, 213, or 215 of an expert level by enhancing the composition and aesthetic properties of the at least one image frame. In an embodiment, the device 100 may recognize a type of composition of the at least one image frame in which the main object or the main action of the object is detected, and perform image processing to crop a region including the main object based on placement of objects in the type of composition. In an embodiment, the device 100 may enhance aesthetic properties of the image frame by adjusting at least one of image quality parameters including brightness, definition, chroma, contrast, or a high dynamic range (HDR) of the cropped image frame.

In an embodiment, the device 100 may recognize an action of the main object in the at least one detected main image frame 201, 203, and 205, determine a highlight section based on a degree to which the recognized action matches a preset action category, and select an image frame corresponding to the highlight section to obtain the short-clip video 220.

The device 100 may use a network model obtained by deep neural network (DNN)-based training, to obtain the expert-level photos 211, 213, and 215 or the short-clip video 220. Here, an expert-level photo may refer to a high-quality image rendered by enhancing the composition and aesthetic properties of a plurality of image frames captured by a camera. Detailed descriptions of how an expert-level photo is generated will be provided herein below.

The device 100 may store the obtained expert-level photos 211, 213, and 215 or short-clip video 220 in a memory (operation ④).

The device 100 may display both the preview image 200 of the subject and the obtained photos 211, 213, and 215 on a display module 120. In an embodiment, the device 100 may display the obtained short-clip video on the display module 120.

In an embodiment, the device 100 may provide a function of sharing the obtained expert-level photos 211, 213, and 215 or short-clip video 220 on a social network site (SNS).

In a case of taking photos or a video in first person viewpoint of daily life and outdoor activities with the camera 110 of the wearable device such as the smart glass, the photo-shoot button needs to be pressed or a voice command needs to be entered at a certain moment to be captured. In this case, an image may not be captured or may result in low-quality photos because of inability of a user to input a command to capture an image or wrong timing of inputting a command to capture an image. Furthermore, unlike smartphones, the wearable device is unable to take high-quality photos or videos that the user wants because the wearable device does not enable the user to check a preview image in person or capture an image of a subject who is in camera-ready posture.

In the example embodiment as shown in FIG. 1, the device 100 of the disclosure may detect main image frames 201, 203, and 205 from among the plurality of image frames obtained by the camera 110, and automatically obtain expert-level photos 211, 213, and 215 having enhanced composition and aesthetic properties through training using an artificial intelligence (AI) model on the detected main image frames 201, 203, and 205. Accordingly, the user may be provided with high-quality photos of a certain meaningful moment that the user does not want to miss while concentrating on a situation in his/her daily life without being interfered by the photo shooting, and accordingly, user convenience may be improved with the device 100 of the disclosure. Furthermore, the device 100 may obtain the short-clip video 220 using the main image frames 201, 203, and 205 in which a main action of an object is recognized by using an AI model, and offer the user the video of a moment that the user wants to keep.

FIG. 2 is a flowchart illustrating a method of automatically capturing a picture or a video of a certain moment according to an embodiment.

In operation S210, a device obtains a preview image including a plurality of image frames sequentially captured through a camera for a preset time interval. In an embodiment, the device may capture with the camera a scene viewed from a first person viewpoint of the user (e.g., objects such as people, things, or buildings, background, landscapes, etc.), and obtain a plurality of consecutive image frames in a time sequence. The device may obtain the plurality of image frames by capturing a subject for the preset time interval (e.g., 10 minutes).

In an embodiment, the device may start capturing the preview image at a point in time when the camera recognizes a main object or a main action in the subject. In another embodiment, the device may start capturing the preview image at a point in time when the user presses a start capture button.

The device may perform image pre-processing tasks such as blur reduction, noise cancellation, image stabilization, or shake removal on the obtained plurality of image frames, in operation S210.

In operation S220, the device detects at least one image frame in which a main object or an action of the main object is recognized. In an embodiment, the device may predefine main objects (e.g., people, pets, foods, goods, or the like) and main actions (e.g., smiling, dancing, running, eating, kissing, exercising, staring, or the like) of objects, and detect at least one image frame in which the predefined main object or main action of an object is recognized.

In an embodiment, the device may recognize the main object in an image frame by using a network model obtained through training based on a DNN having an input of a plurality of photos including the predefined main objects to output label values of categories of the main objects. In an embodiment, the device may recognize the main action of an object in an image frame by using a network model obtained by training with a DNN with an image of a predefined main action of an object in numerous photos as input and label values of action categories as output.

In operation S230, the device recognizes a type of composition of the at least one image frame.

In an embodiment, the device may recognize a type of composition of the at least one image frame detected in operation S220, and crop a region including the main object from the at least one image frame based on placement of objects in the type of composition recognized in operation S230. The device may recognize the type of composition of at least one image by using a network model obtained in advance by training a DNN with numerous photos as learning data. The device may enhance aesthetic properties of the cropped image frame by adjusting at least one of image quality parameters including brightness, definition, chroma, contrast, or high dynamic range (HDR) of the cropped image frame. In an embodiment, the device may predict an aesthetic estimation score of the cropped image frame by using a trained DNN obtained in advance and adjust at least one of the image quality parameters based on the predicted aesthetic estimation score. The device may obtain an expert-level photo of a certain moment by using an aesthetically enhanced image frame.

An embodiment in which the device obtains a photo of a certain moment through training using a DNN will be described in detail with reference to FIGS. 7 to 9.

In an embodiment, the device may analyze an action of the main object in the at least one image frame detected in operation S220, predict a highlight estimation score that indicates a degree to which the analyzed action of the main object matches a preset action category, and select at least one image frame based on the predicted highlight estimation score to obtain a video. In an embodiment, the device may predict the highlight score of at least one image frame by using a network model obtained in advance through training using a DNN with numerous photos including actions of main objects as input and highlight scores for action categories as output.

An embodiment in which the device obtains a short-clip video through training using a DNN will be described in detail with reference to FIGS. 10 to 11.

In operation S250, the device stores the obtained photo. In an embodiment, the device may store the preview image obtained in operation S210 in an original format, and store the obtained expert-level photo with the preview image. In an embodiment, the device may reproduce the at least one expert-level photo in a slide show format.

In an embodiment, the device may store the preview image obtained in operation S210 in an original video format, and store a obtained video with the original video.

In an embodiment, the device may obtain an expert-level photo by improving composition and aesthetic properties of a photo stored in a storage such as a memory. In an embodiment, the device may obtain an expert-level photo by improving composition and aesthetic properties of each photo included in a photo folder selected based on a user input, and store the obtained expert-level photo. In an embodiment, the device may obtain expert-level photos by improving composition and aesthetic properties of all photos included in a photo folder selected based on a user input, and store the obtained expert-level photos.

In an embodiment, the device may obtain expert-level photos by improving composition and aesthetic properties of the stored photos periodically (e.g., once a month) during a preset particular time zone (e.g., from 2 to 4 a.m.), and store the obtained expert-level photos.

In an embodiment, the device may detect a highlight section in a video stored in the storage, use at least one photo corresponding to the detected highlight section to obtain a short-clip video, and store the obtained short-clip video.

In an embodiment, the device may obtain a highlight short-clip video for the stored video periodically (e.g., once a week) during a preset particular time zone (e.g., from 1 a.m. to 2 a.m.), and store the obtained short-clip video.

Figure 3A:
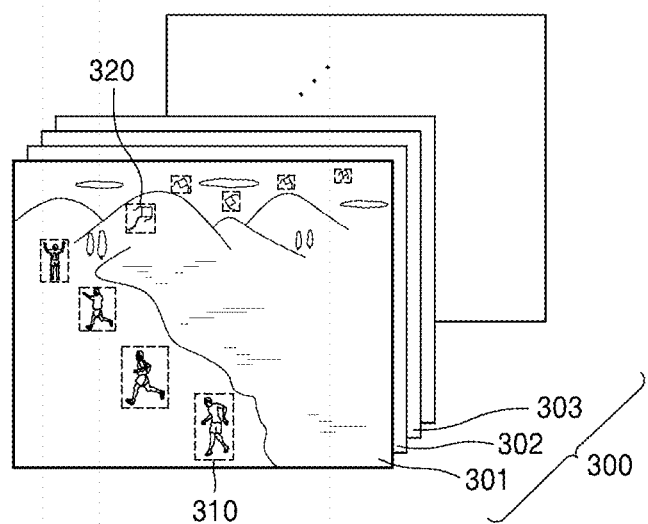
FIG. 3A illustrates an example in which a device recognizes a main object from a plurality of image frames according to an embodiment.
Figure 3B:
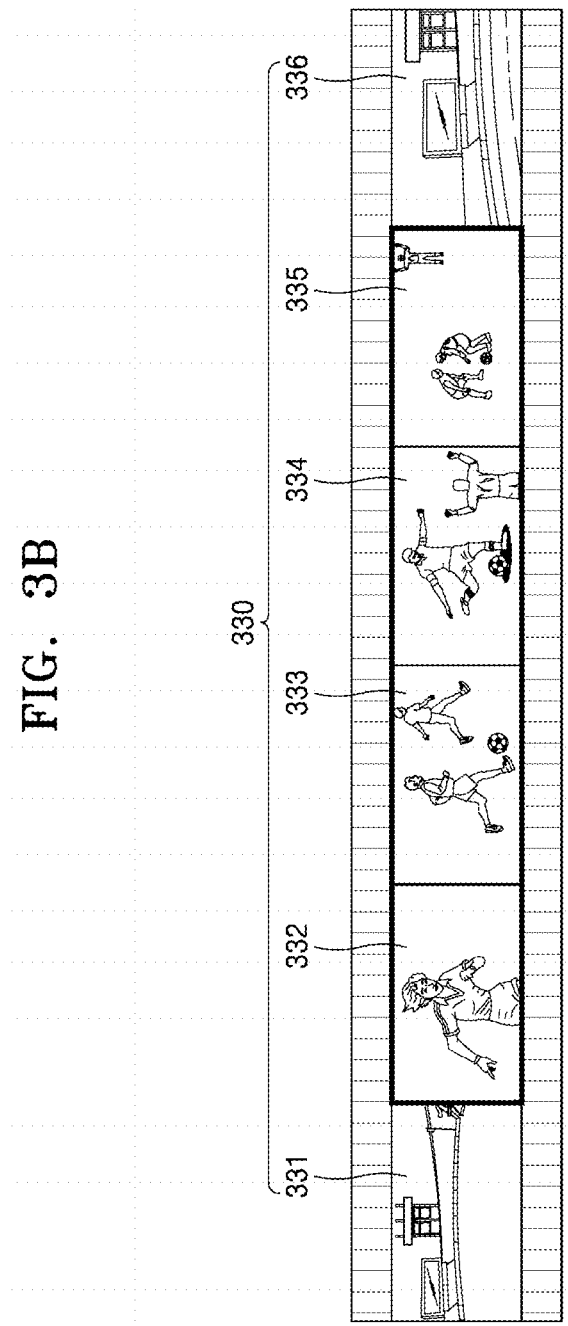
FIG. 3B illustrates an example in which a device recognizes an action of a main object from a plurality of image frames according to an embodiment.

FIG. 3A illustrates an example in which a device recognizes main objects from a plurality of image frames according to an embodiment, and FIG. 3B illustrates an example in which a device recognizes actions of main objects from a plurality of image frames according to an embodiment.

Referring to FIG. 3A, the device may start capturing a preview image 300 at a time when the camera recognizes a main object in a subject. The device may recognize the preset main object (e.g., people, pets, foods, goods, or the like) in the image frame obtained by capturing with the camera. In an embodiment, the device may predefine a main object for each category, and start capturing the preview image 300 once the predefined main object is recognized in the image frame. In an embodiment shown in FIG. 3A, the device may recognize the predefined main objects, people and things (e.g., kites), in a first image frame 301 captured by the camera, and obtain information about regions of interest (ROIs) 310 and 320. In an embodiment, the device may obtain image coordinate information of the ROI box 310 in which a person is recognized in the image frame.

The device may recognize the main object in the first image frame 301 through an artificial neural network-based training. In an embodiment, the device may recognize a main object from the first image frame 301 by using a network model obtained through training with an artificial neural network having an input of numerous photos including main objects to output category information of main objects. The device may obtain the network model by performing training based on a known DNN such as a convolution neural network (CNN) or a recurrent neural network (RNN), and recognize a main object from the first image frame 301 by using the obtained network model.

The device may set a point of time at which a main object is recognized from the first image frame 301 as a time to start capturing, and obtain a plurality of image frames by sequentially capturing a subject for a preset period of time from the time to start capturing. For example, the device may obtain the preview image 300 by capturing a plurality of image frames for 10 minutes from the start time of capturing. The preview image 300 may include the first image frame 301, a second image frame 302, . . . , and an N-th image frame. A time interval between the first image frame 301 and the second image frame 302 may be determined depending on the number of frames captured in one second, e.g., frames per second (fps).

Referring to FIG. 3B, the device may recognize an action of a main object in a preview image 330 including a plurality of image frames 331 to 336 obtained by sequentially capturing with the camera. In an embodiment, the device may predefine actions of the main object into categories, and recognize the predefined action of each category in the plurality of image frames 331 to 336.

The device may recognize actions of the main object in the plurality of image frames 331 to 336 through an artificial neural network-based training. In an embodiment, the device may recognize actions of the main object from the plurality of image frames 331 to 336 by using a network model obtained through training using an artificial neural network with numerous photos containing actions of the main object as input and action category information of the main object as output. The device may obtain the network model by performing training based on a known DNN such as a CNN or an RNN, and recognize actions of the main object from the plurality of image frames 331 to 336 by using the obtained network model.

The device may obtain an action section information including numbers and a time interval of frames in which actions are recognized. The device may obtain frame numbers of a start frame and an end frame in which the action is recognized. The device may obtain time information about a start time and an end time of an action that is recognized.

In the example embodiment as shown in FIG. 3B, the device may recognize an action of a person (main object) playing football (main action) in the preview image 330, and obtain the number of the second frame 332, which is a start frame, and a number of the fifth frame 335, which is an end frame, in which the action is recognized. In another embodiment, the device may obtain information about a time at which the second frame 332 is captured and a time at which the fifth frame 335 is captured.

FIG. 4 is a flowchart illustrating a method of setting a time to start capturing according to an embodiment.

In operation S410, the device receives a user input to determine a time to start capturing a preview image. In an embodiment, the device may receive a user input of pressing a start capture button when capturing has not been performed with the camera.

In operation S420, the device starts capturing the preview image based on the user input.

In operation S430, the device obtains a plurality of image frames captured for a preset time interval from the start capture time.

Figure 5:
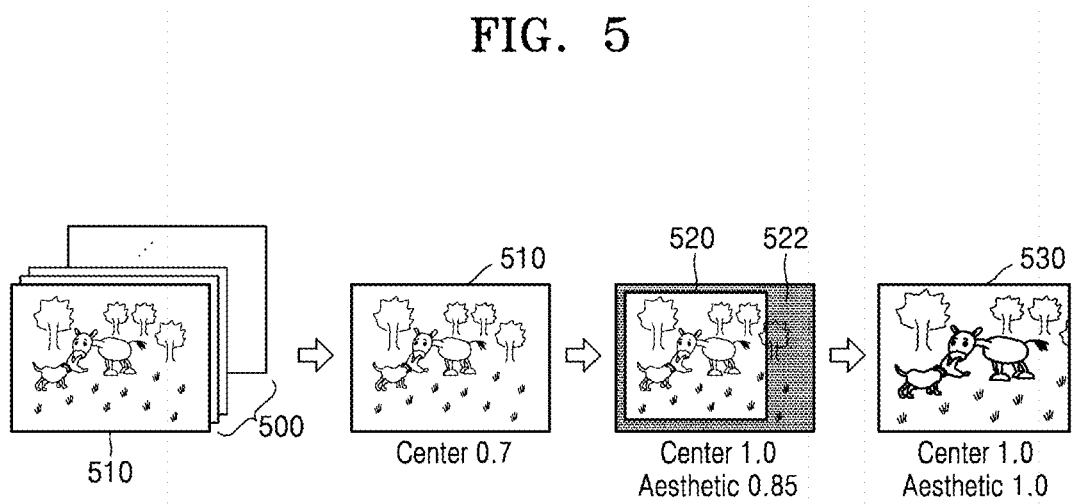
FIG. 5 illustrates an example in which a device obtains an expert level photo by enhancing the composition and aesthetic properties of at least one image frame, according to an embodiment.

FIG. 5 illustrates an example in which a device obtain an expert level photo by enhancing the composition and aesthetic properties of at least one image frame, according to an embodiment.

Referring to FIG. 5, the device may obtain a plurality of image frames 500 by sequentially capturing a subject through a camera for a preset time interval. The device may use image processing techniques to perform preprocessing tasks to reduce blur, cancel noise, and compensate for shaking due to hand trembling. The device may recognize a main object in a first image frame 510 among the plurality of image frames 500. In an embodiment, the device may obtain ROI box information of the main object in the first image frame 510. A method, performed by the device, of recognizing the main object in the first image frame 510 is the same as the method described in connection with FIG. 3A, and thus, repeated descriptions thereof are omitted.

The device may recognize a composition type based on the placement of the main object in the first image frame 510. The composition of a photo includes geometrical elements such as points, lines, planes, and shapes in an image, and the expression 'good composition' may refer to an object being in a harmonious geometrical placement state. The 'good composition' may be, however, individualistic and subjective, so it may not be estimated objectively.

Hence, in an embodiment of the disclosure, the device may predefine a plurality of composition types defined by experienced photo specialists, perform DNN-based training with a plurality of photos as input and the predefined composition types as output, and recognize a composition type of an image frame using a network model obtained by the training. In the example embodiment as shown in FIG. 5, the device may recognize the first image frame 510 as having a center composition where the main subject is placed in the center of the image.

The device may crop a first region 520 that includes the main object from the first image frame 510 based on the recognized composition type. In an embodiment, the device may determine the first region 520, which is a region including the main object, based on placement of objects in the recognized composition type. In the example embodiment as shown in FIG. 5, because the center composition is recognized, the device may determine the first region 520 where the main object is placed in the center of the image, and remove a second region 522, which is areas other than the first region 520, from the first image frame 510.

The device may obtain a cropped image frame including only the first region 520, and predict an aesthetic estimation score of the cropped image frame. Herein, the term 'aesthetic' may mean an aesthetic estimation or feeling felt by a person when a photo is viewed by the person, and the expression 'having aesthetic properties' may refer to a well taken photo. A photo with high aesthetic properties may be obtained by creatively capturing a subject using six factors of a photo: light, composition, certain moment, color palette, exposure time, and wonder. The 'aesthetic property' is, however, a property emotionally felt when the person views the photo and the aesthetic feeling felt by each person is subjective and different, so it may not be estimated in objective indexes. Hence, in an embodiment of the disclosure, the device may perform training with a DNN using data sets about aesthetic estimation scores estimated by people when they see numerous photos, and predict an aesthetic estimation score of an image frame by using a network model obtained through the training. In the example embodiment as shown in FIG. 5, the device may predict an aesthetic estimation score of the cropped image frame to be 0.85 by using the network model.

The device may improve the aesthetic property of the cropped image frame by adjusting at least one of image quality parameters including brightness, definition, chroma, contrast, or HDR of the cropped image frame based on the predicted aesthetic estimation score. In an embodiment, the device may adjust the image quality parameters of the cropped image frame by using a network model obtained by training that uses a model parameter indicating a loss between an original photo and the aesthetically enhanced photo.

The device may obtain an expert-level photo 530 using the aesthetically enhanced image frame.

In the embodiment shown in FIG. 5, the device may recognize, from the sequentially captured preview images, a composition type of the first image frame 510 where the main objects are recognized, obtain a cropped image frame by cropping the image frame based on the composition type, predict an aesthetic estimation score of the cropped image frame, and perform a series of processes to enhance aesthetic properties of the cropped image frame by using a network model obtained through training with a DNN, thereby significantly increasing the execution speed as compared to the existing pixel-based image processing algorithm. Furthermore, in an embodiment of the disclosure, the device may detect the composition type from the first image frame 510 by using a network model obtained by training with a DNN, thereby increasing the accuracy of the detected composition.

FIG. 6 is a flowchart illustrating a method of obtaining an expert level photo by enhancing the composition and aesthetic properties of at least one image frame, according to an embodiment.

In operation S610, the device recognizes a composition type of the at least one image frame. In an embodiment, the device may recognize a composition type of at least one image frame by using a first neural network model obtained through training with a first DNN having an input of numerous photos to output label values of a plurality of composition types predefined by photo specialists. The device may perform training with an AI learning module that performs training using a DNN such as a CNN or an RNN, and obtain the first neural network model. However, the one or more embodiments are not limited thereto, and the device may perform training using an algorithm such as support vector machine (SVM), linear regression, logistic regression, Naive Bayes classification, decision tree, k-nearest neighbor algorithm, etc. The first neural network model may be obtained before the at least one image frame is obtained.

In operation S620, the device may crop a region including a main object from the at least one image frame based on the recognized composition type. In an embodiment, the device may perform image processing to leave only the region containing the main object but remove the remaining regions from the at least one image frame based on placement of objects in the recognized composition type.

In operation S630, the device improves aesthetic properties of the cropped image frame by adjusting at least one image quality parameter of brightness, definition, chroma, contrast, or HDR of the cropped image frame. In an embodiment, the device may predict an aesthetic estimation score of the cropped image frame by using a second neural network model obtained through training with numerous photos as input and normalized values of aesthetic scores estimated for the numerous photos as output. The device may perform training using an AI learning module that performs training using a DNN such as a CNN or an RNN, and obtain the second neural network model. However, the one or more embodiments are not limited thereto, and the device may perform training using an algorithm such as SVM, linear regression, logistic regression, Naive Bayes classification, decision tree, k-nearest neighbor algorithm, etc. The second neural network model may be obtained before the cropped image frame is obtained.

In an embodiment, the device may adjust at least one of image quality parameters of the cropped image frame by using a third neural network model obtained by training a model parameter that indicates a loss between an original photo and the aesthetically enhanced photo. The model parameter indicating the loss between the original photo and the aesthetically enhanced photo may be obtained by training before the cropped image frame is obtained.

The first neural network model used in operation 620, the second neural network model used in operation 630, and the third neural network model may be obtained by training that uses a DNN such as a CNN or an RNN. The first to third neural network models, however, may be separate and independent networks that train different model parameters.

In operation S640, the device obtains a photo using an aesthetically enhanced image frame. In an embodiment, the device may crop the image frame based on the composition type recognized in operation 620, and create an expert-level photo by enhancing aesthetic properties of the image frame cropped in operation 630.

Figure 7A:
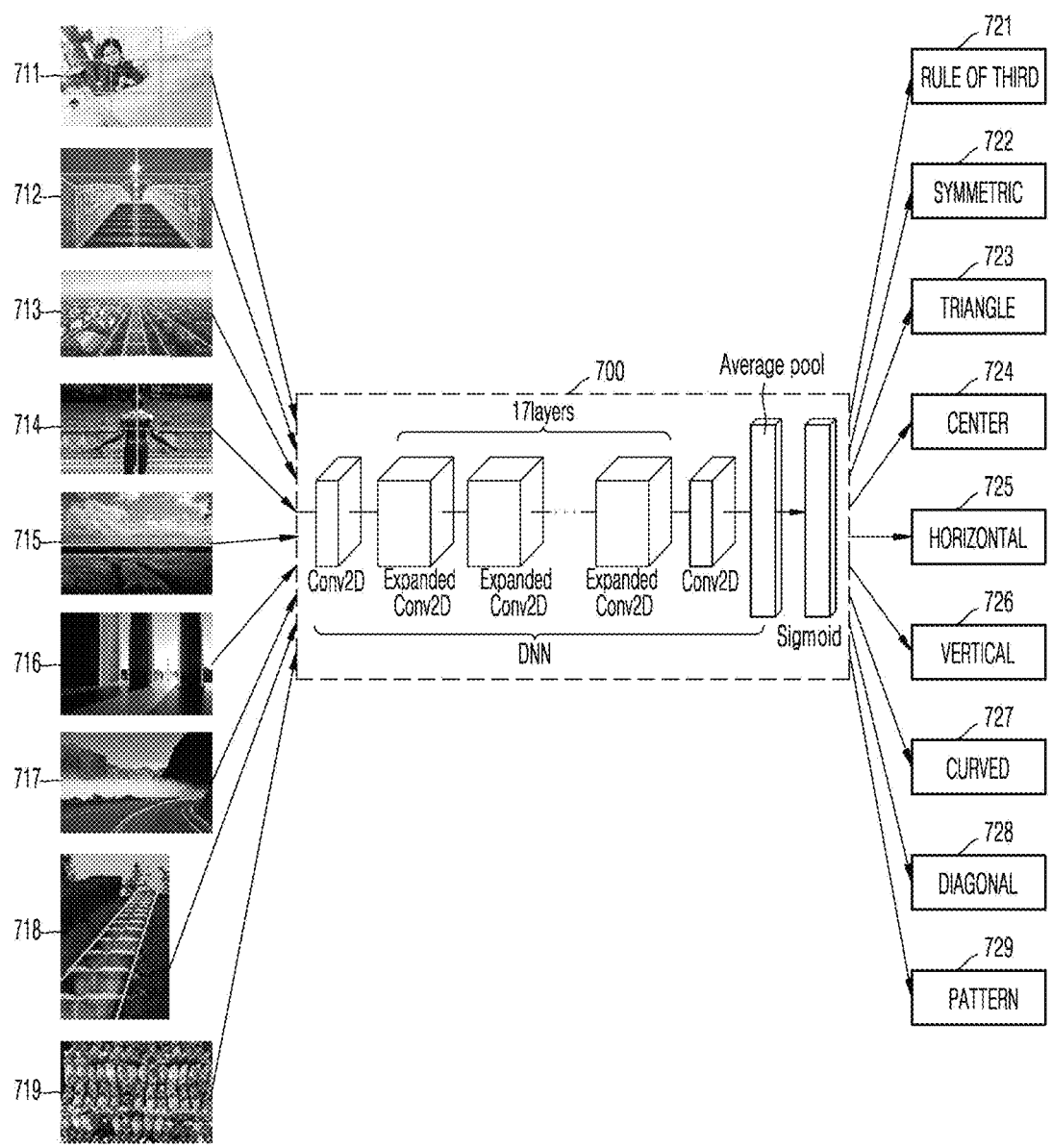
FIG. 7A illustrates a method of training types of composition of a plurality of photos using a deep neural network (DNN) according to an embodiment.

FIG. 7A illustrates a method of training composition types of a plurality of photos 711 to 719 using a DNN 700 according to an embodiment.

Referring to FIG. 7A, the device may perform training using the DNN 700 with the plurality of photos 711 to 719 as input label values 721 to 729 of nine composition types as output, and obtain a network model. The training using the DNN 700 may be performed by the device, but is not limited thereto. In an embodiment, the training using the DNN 700 may be performed by a server, and a network model obtained by the server may be transmitted to the device through a communication network.

The device may apply the plurality of photos 711 to 719 captured in a certain composition to the DNN 700 as an input, and perform training to output a composition type of each of the plurality of photos. For example, the first photo 711 is captured by the rule of the third composition, the first photo 711 and the first label value 721 of the rule of third the composition make a first input and output pair, and the DNN 700 may learn using the first input and output pair. The second photo 712 is captured in symmetric composition, the second photo 712 and the second label value 722 of the symmetric composition make a second input and output pair, and the DNN 700 may learn using the second input and output pair. In the aforementioned manner, the third photo 713 makes an input and output pair with the third label value 723 of the triangle composition; the fourth photo 714 makes an input and output pair with the fourth label value 724 of the center composition; the fifth photo 715 makes an input and output pair with the fifth label value 725 of the horizontal composition; the sixth photo 716 makes an input and output pair with the sixth label value 726 of vertical composition; the seventh photo 717 makes an input and output pair with the seventh label value 727 of the curved composition; the eighth photo 718 makes an input and output pair with the fourth label value 728 of the diagonal composition; the ninth photo 719 makes an input and output pair with the ninth label value 729 of the pattern composition, and the DNN 700 may perform training using the input and output pairs.

The DNN 700 may be a CNN including a plurality of convolution layers. The DNN 700 may include a total of 17 convolution layers, and may be implemented as a CNN model that outputs a model parameter value trained through the convolution layers in a sigmoid function after average pooling. However, the one or more embodiments are not limited thereto, and the device may perform training using a DNN such as an RNN or an algorithm such as SVM, linear regression, logistic regression, Naive Bayes classification, decision tree, k-nearest neighbor algorithm, etc. Also, the number of convolution layers may be any natural number greater than or equal to 1.

In the example embodiment as shown in FIG. 7A, the DNN 700 may be implemented based on Mobilenet-v2 NET CNN model. Although it is shown that the DNN 700 includes 17 convolution layers, it is only an example and is not limited thereto.

In an embodiment, the device may perform training with about 15,000 photos. The device may perform training through the DNN 700 by applying a minimum of 175 to a maximum of 9,100 photos for each composition type as an input and a label value of a composition type as an output.

In an embodiment, the plurality of photos 711 to 719 applied as an input to the DNN 700 may be compressed photos with a resolution of 299×299.

In an embodiment, the DNN 700 may increase accuracy using the sigmoid output, without being limited thereto. Depending on the composition type, the DNN 700 may use a ReLU function or a softmax or hyperbolic tangent (tan h) function as an output function.

Figure 7B:
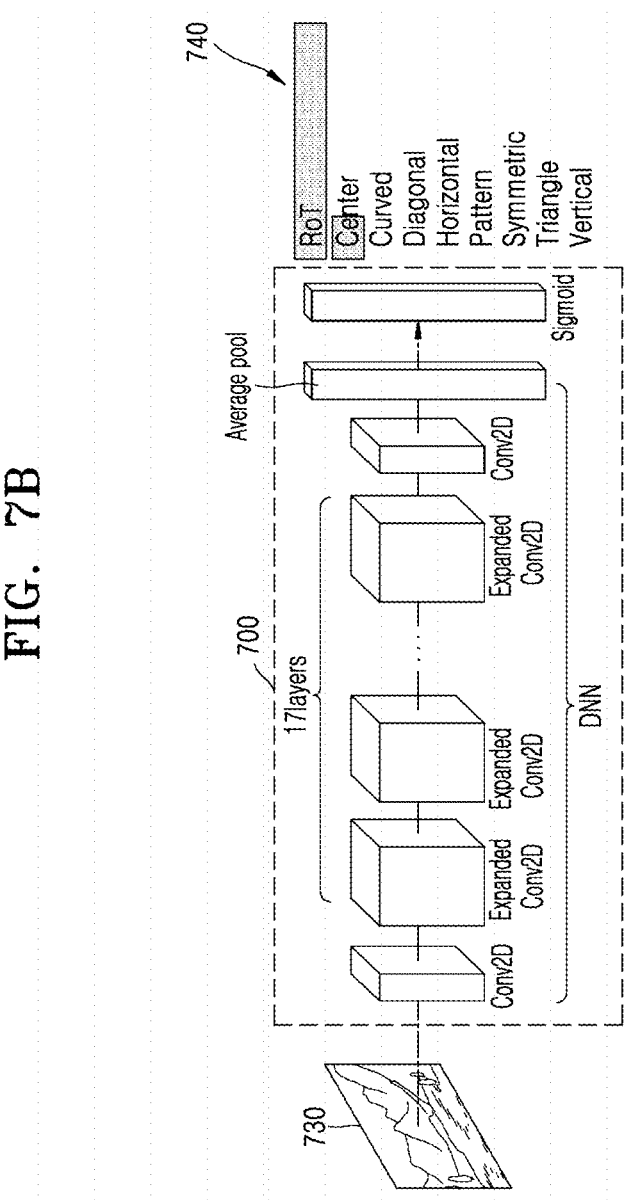
FIG. 7B is illustrates a method of recognizing a type of composition of an image frame using a DNN according to an embodiment.

FIG. 7B is illustrates a method of recognizing a composition type of an image frame using the DNN 700 according to an embodiment.

Referring to FIG. 7B, the device may enter an image frame obtained by capturing through a camera to the DNN 700 to recognize a composition type. The DNN 700 may include a network model parameter obtained by training as described in connection with FIG. 7A. The network model parameter of the DNN 700 may be a parameter obtained by training before an image frame is captured.

In an embodiment, the device may enter, to the DNN 700, at least one image frame where a main object or an action of the main object is recognized, among the plurality of image frames captured with the camera, to recognize a composition type. In the example embodiment shown in FIG. 7B, the device may input an input image frame 730 to the DNN 700 to obtain an output value 740. The output value 740 for the input image frame 730 may be provided in histograms of the rule of the third composition and the center composition. As a value more closely approximate to a label value of the rule of the third composition is output, the input image frame 730 may be recognized as the rule of the third composition.

In the embodiment shown in FIGS. 7A and 7B, the device may significantly reduce processing time by recognizing the composition type of an input image frame captured through a camera using the DNN 700, as compared with the existing Saliency-based method of detecting main objects and a method of recognizing composition through detection of a super-pixel-based leading line and sky region.

Figure 8A:
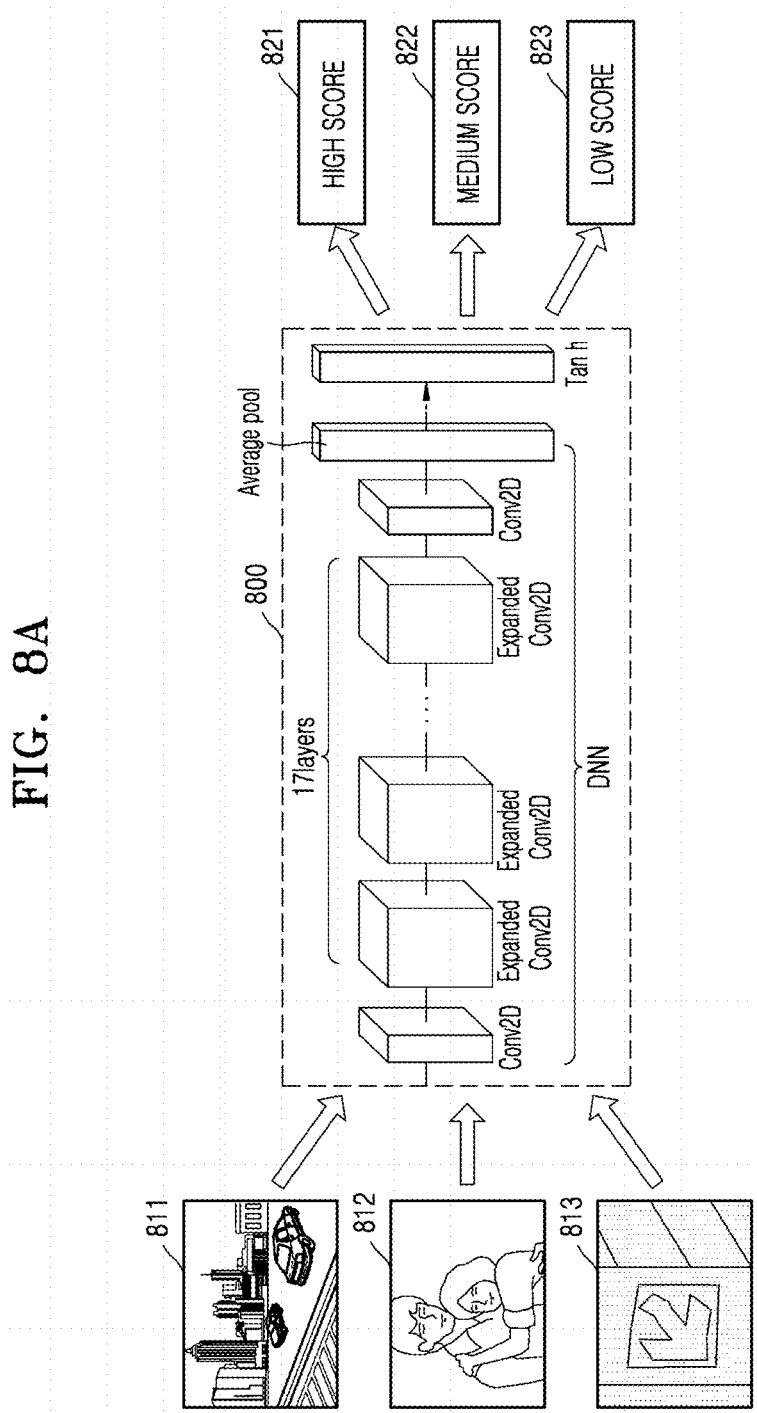
FIG. 8A illustrates an example in which a device trains aesthetic estimation scores of a plurality of photos using a DNN according to an embodiment.

FIG. 8A illustrates an example in which a device trains aesthetic estimation scores of a plurality of photos using a DNN 800 according to an embodiment.

Referring to FIG. 8A, the device may perform training using the DNN 800 with a plurality of photos 811 to 813 as input and a normalized high score 821, a medium score 822, and a low score 823 obtained by dividing aesthetic estimation scores into three levels as output, and obtain a network model. The training using the DNN 800 may be performed by the device, but is not limited thereto. In an embodiment, the training using the DNN 800 may be performed by a server, and a network model obtained by the server may be transmitted to the device through a communication network.

The device may perform training using input and output pairs of the plurality of photos 811 to 813 and pre-estimated aesthetic scores of the plurality of photos 811 to 813. Herein, the expression 'aesthetic estimation scores' may refer to scores of aesthetic properties estimated by people who have viewed the photos based on 6 estimation factors such as light, composition, certain moment, color palette, exposure time, and wonder of the photos, and the scores may be distributed between 0 to 10. For example, 6 or higher of the aesthetic estimation scores may be classified as a high score, 4 or lower as a low score, and 5 as a medium score. In an embodiment, the device may normalize the aesthetic estimation scores to values between 0 and 1. In this case, 0.6 or higher of the aesthetic estimation scores may be classified as a high score, 0.4 or lower as a low score, and 0.5 as a medium score.

For example, the device may classify the first photo 811 as having high aesthetic properties, and make a first input and output pair using the first photo 811 and the high score 821. Similarly, the device may make the second photo 812 and the medium score 822 into a second input and output pair and the third photo 813 and the low score 823 into a third input and output pair. The device may perform training by applying the first to third input and output pairs to the DNN 800.

The DNN 800 may be a CNN including a plurality of convolution layers. The DNN 800 may include a total 17 convolution layers, and may be implemented as a CNN model that outputs a model parameter value trained through the convolution layers in a hyperbolic tangent (tan h) function after average pooling. Although it is shown in FIG. 8A that the DNN 800 includes 17 convolution layers, it is an example of implementation and is not limited thereto. Depending on the composition type, the DNN 800 may use a ReLU function or a softmax or Sigmoid function as an output function.

However, the one or more embodiments are not limited thereto, and the device may perform training based on a known DNN such as an RNN or an algorithm such as SVM, linear regression, logistic regression, Naive Bayes classification, decision tree, k-nearest neighbor algorithm, etc.

In the example embodiment shown in FIG. 8A, the DNN 800 may be implemented based on Mobilenet-v2 NET CNN model. In an embodiment, the device may learn by applying an aesthetic visual analysis (AVA) data set, which is data of scores of aesthetic properties estimated by 200 estimators for each of about 250 thousand photos, to the DNN 800 (AVA: A large-scale database for aesthetic visual analysis, 2012 Computer Vision and Pattern Recognition). In an embodiment, aesthetic estimation scores of the AVA data set have values between 0 and 10, but the aesthetic estimation scores applied as an output of the DNN 800 may have values between 0 and 1 obtained by normalizing the aesthetic estimation scores of the AVA data set by 1/10. As the aesthetic estimation score is closer to 1, it may mean that a photo is an aesthetically well-taken photo.

Figure 8B:
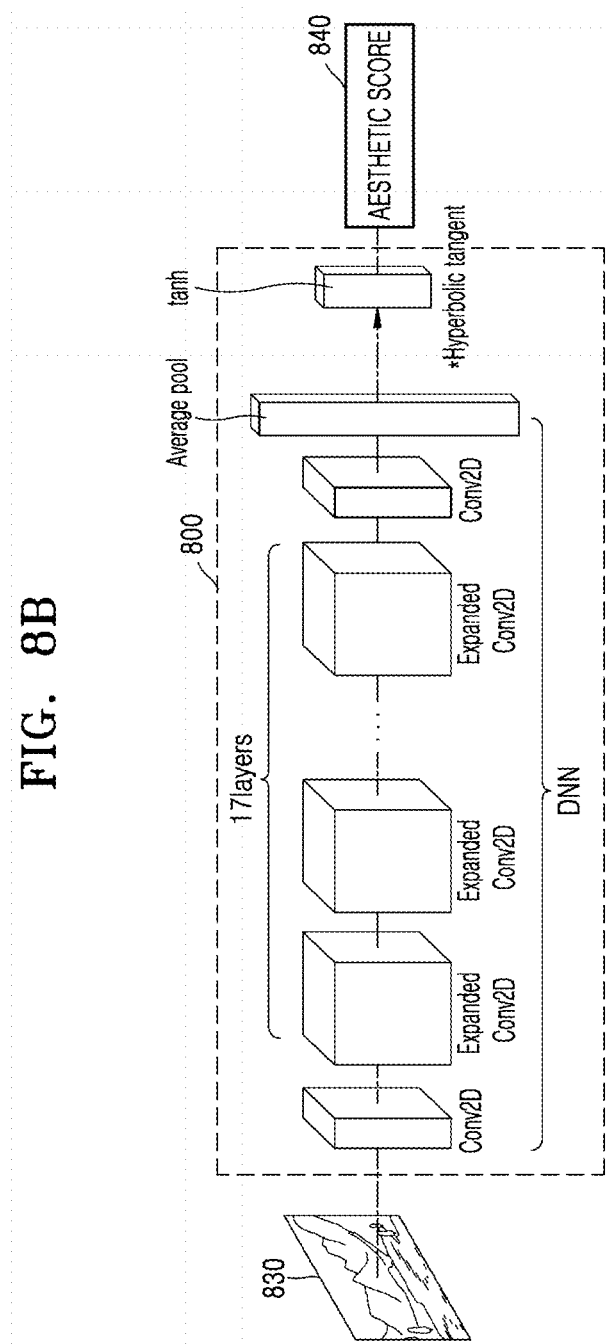
FIG. 8B illustrates an example in which a device predicts an aesthetic estimation score of an image frame using a DNN according to an embodiment.

FIG. 8B illustrates an example in which a device predicts an aesthetic estimation score of an image frame using the DNN 800 according to an embodiment.

Referring to FIG. 8B, the device may predict an aesthetic estimation score 840 by entering a cropped image frame 830 created by cropping an image frame based on a composition type. Herein, the cropped image frame 830 may refer to a cropped image frame that has undergone operation S620 of FIG. 6. The DNN 800 may include a network model parameter obtained by the training as described in connection with FIG. 8A. The network model parameter of the DNN 800 may be a parameter obtained by training before the cropped image frame is obtained.

In the example embodiments shown in FIGS. 8A and 8B, the device may predict an aesthetic estimation score of a cropped image frame using the DNN 800, thereby reducing a time required for the prediction as compared with a method based on the pixel-based image processing. Furthermore, through the training using the obtained data set of aesthetic estimation scores, estimation scores of aesthetic properties of photos, which are usually individualistic and subjective indexes, may be determined by objectifying and quantifying them.

Figure 9:
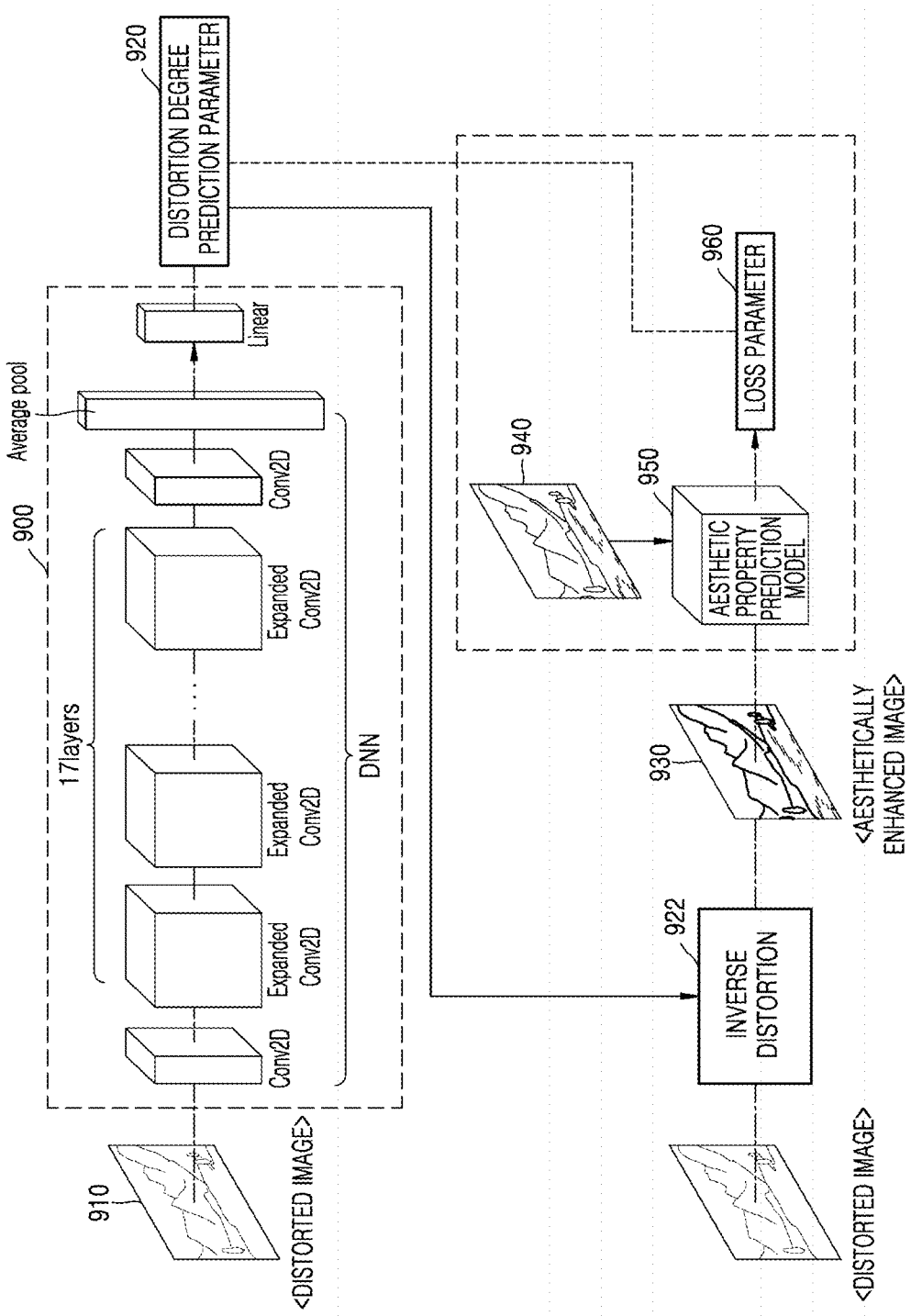
FIG. 9 illustrates an example in which a device enhances aesthetic properties of a distorted image through DNN-based learning according to an embodiment.

FIG. 9 illustrates an example in which a device enhances aesthetic properties of a distorted image 910 through training using a DNN 900 according to an embodiment.

Referring to FIG. 9, the device may obtain a loss parameter 960 that indicates a loss between an aesthetically enhanced image 930 and an original image 940 by using an aesthetic property prediction model 950, and predict a degree of distortion of the distorted image 910 through training with the loss parameter 960.

In FIG. 9, the distorted image 910 may refer to an image having the aesthetic estimation factors such as brightness, definition, chroma, contrast, HDR, etc., inappropriately distorted, or a blurred or shaky image. In an embodiment, the distorted image 910 may be an image, which has been input to the DNN 800 shown in FIG. 8B and has a predicted aesthetic estimation score of 0.4 or less.

The device may calculate an inverse distortion parameter 922 of a distortion degree prediction parameter 920, and enhance aesthetic properties by applying the inverse distortion parameter 922 to the distorted image 910 to adjust at least one of image quality parameters including brightness, definition, chroma, contrast, HDR, etc., of the distorted image 910. The device may obtain the aesthetically enhanced image 930 from the distorted image 910.

In the embodiment shown in FIG. 9, the procedure of obtaining the loss parameter 960 that indicates a loss between the aesthetically enhanced image 930 and the original image 940 by using an aesthetic property prediction model 950 may be performed only for training through the DNN 900. In an embodiment, the obtained loss parameter 960 may be used to train the distortion degree prediction parameter 920 to calculate the inverse distortion parameter 922 for obtaining the aesthetically enhanced image 930 from the distorted image 910.

Figure 10:
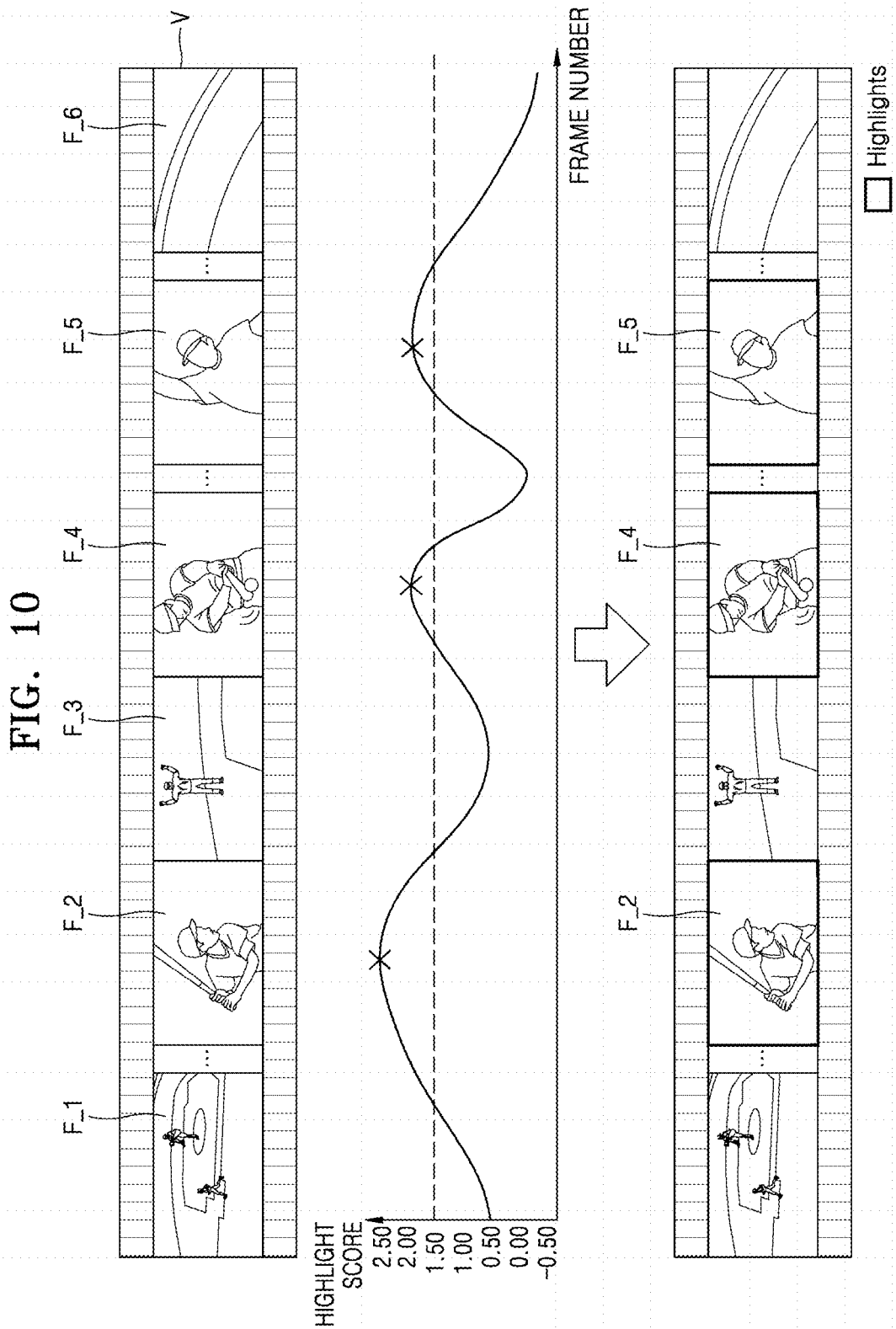
FIG. 10 illustrates an example in which a device predicts highlight scores of a plurality of image frames to obtain a short-clip video according to an embodiment.

FIG. 10 illustrates an example in which a device predicts highlight scores of a plurality of image frames to obtain a short-clip video according to an embodiment.

Referring to FIG. 10, the device may obtain a video file V including a plurality of image frames F_1 to F_6 by sequentially capturing a subject through a camera for a preset time interval.

The device may analyze an action of a main object in the plurality of image frames F_1 to F_6, and predict a highlight estimation score that indicates a degree to which the analyzed action of the main object matches a preset action category. In an embodiment, the device may obtain a network model through training using a DNN with an input of numerous images containing main actions of predefined objects (e.g., smiling, dancing, running, eating, kissing, exercising, staring, etc.), to output label values of action categories, and analyze an action of a main object in the video V using the obtained network model. The device may perform training using a DNN such as a CNN or an RNN, and obtain a network model. However, the one or more embodiments are not limited thereto, and the device may perform training based on an algorithm such as e.g., SVM, linear regression, logistic regression, Naive Bayes classification, decision tree, k-nearest neighbor algorithm, etc. In an embodiment, training on actions of main objects may be performed by a server instead of the device.

The device may determine a frame number or time section of an image frame having a highlight estimation score equal to or greater than a threshold. In the example embodiment as shown in FIG. 10, the device may obtain information about a second image F_2, a fourth image frame F_4, and a fifth image frame F_5, which have predicted highlight scores equal to or greater than 1.5.

The device may extract image frames corresponding to the determined frame numbers or time section, and obtain a short-clip video using the extracted image frames. In the example embodiment as shown in FIG. 10, the device may extract the second image frame F_2, the fourth image frame F_4, and the fifth image frame F_5, and obtain a short-clip video by linking the extracted second image frame F_2, the fourth image frame F_4, and the fifth image frame F_5.

In the embodiment, the device may obtain a highlight video including the extracted second image frame F_2, fourth image frame F_4, and fifth image frame F_5 played slowly and the first image frame F_1, the third image frame F_3, and the sixth image frame F_6 played relatively fast.

In an embodiment, the video V may be stored in a storage in the device. The device may predict highlight scores of the plurality of image frames F_1 to F_6 included in the video V stored in the storage, and obtain a short-clip video using the second image frame F_2, the fourth image frame F_4, and the fifth image frame F_5 having the predicted highlight scores equal to or greater than a reference value. In an embodiment, the device may obtain a short-clip video for the stored video V periodically (e.g., once a week) in a certain preset time zone (e.g., a time zone from 1 to 2 a.m.).

Figure 11:
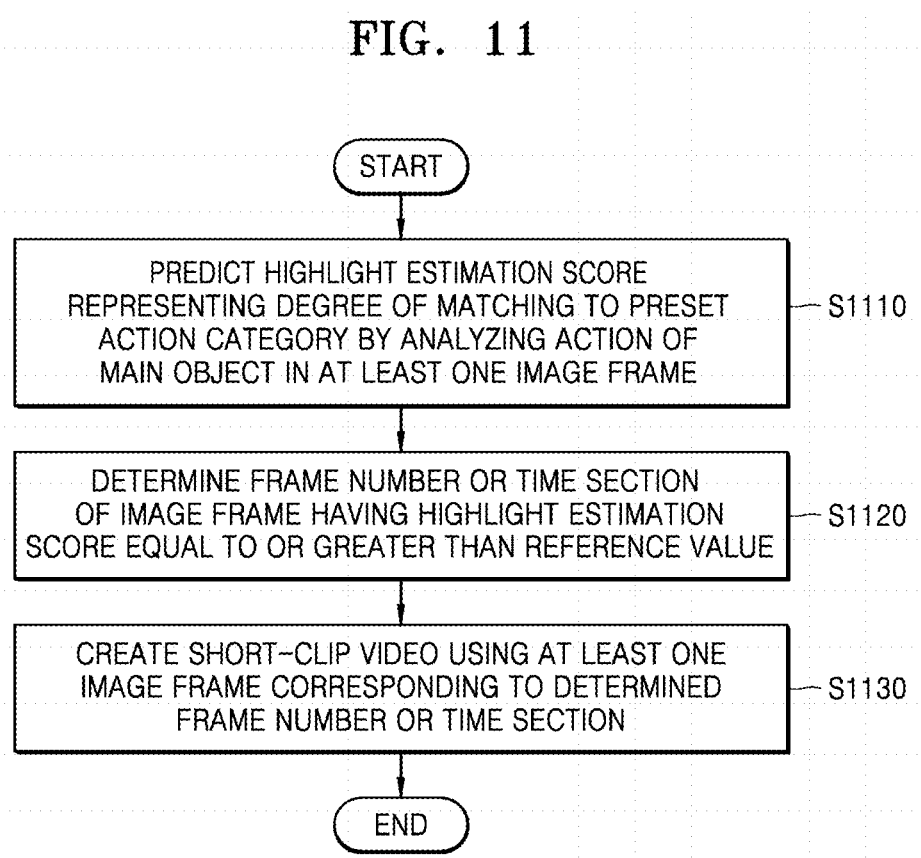
FIG. 11 is a flowchart illustrating a method of predicting highlight scores of a plurality of image frames to obtain a short-clip video according to an embodiment.

FIG. 11 is a flowchart illustrating a method of predicting highlight scores of a plurality of image frames to obtain a short-clip video according to an embodiment.

In operation S1110, the device analyzes an action of a main object in at least one image frame, and predicts a highlight estimation score indicating a degree of matching to the preset action category. In an embodiment, the device may use a network model obtained by performing training through a DNN, to recognize an action of a main object from at least one image frame. A detailed description of this operation is described with reference to FIG. 10 above, and thus, repeated descriptions thereof are omitted.

In operation S1120, the device determines a frame number and/or a time section of an image frame having a highlight estimation score equal to or greater than the reference value.

In operation S1130, the device uses the at least one image frame corresponding to the determined frame number or time section to obtain a short-clip video. In an embodiment, the device may extract at least one image frame corresponding to the determined frame number or time section, and obtain a short-clip video by linking the extracted at least one image frame. In an embodiment, the device may obtain a video including the extracted at least one image frame played slowly and non-extracted remaining image frames played relatively fast.

In an embodiment, the device may obtain a video by selectively extracting only a representative image frame for a split interval, e.g., image frames with the highest highlight scores in the split intervals.

Figure 12:
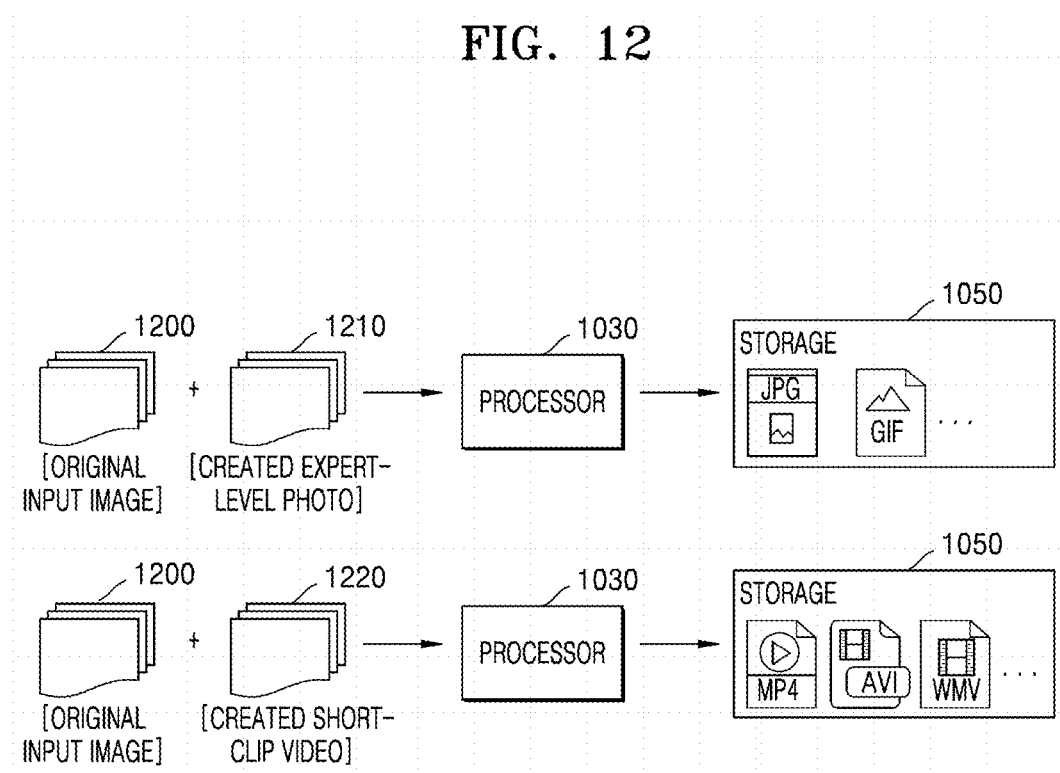
FIG. 12 illustrates an example in which a device stores a obtained photo or video according to an embodiment.

FIG. 12 illustrates an example in which a device stores a obtained photo or video according to an embodiment.

Referring to FIG. 12, the device may store a plurality of original input images 1200 and a plurality of expert-level photos 1210 in a storage 1050. In an embodiment, a component of the device, a processor 1030 may put together the plurality of expert-level photos 1210 to obtain a file in a gif format, and store the file in a jpg format for each of the plurality of original input images 1200 in the storage 1050. The processor 1030 may play the gif file obtained by putting together the plurality of expert-level photos 1210 in the form of a slide show. However, the format of the original input images and expert-level photos are not limited thereto, and may include any other image formats that is suitable for image processing and storage.

The device may store the original input images 1200 and a obtained short-clip video 1220 in the storage 1050. In an embodiment, the processor 1030 may obtain a video in an MP4 format by putting together the plurality of original input images 1200, and store the short-clip video 1220 in a video format such as avi, wmv, etc. However, the video format is not limited thereto, and may include any other video format that is suitable for image processing and storage.

Figure 13:
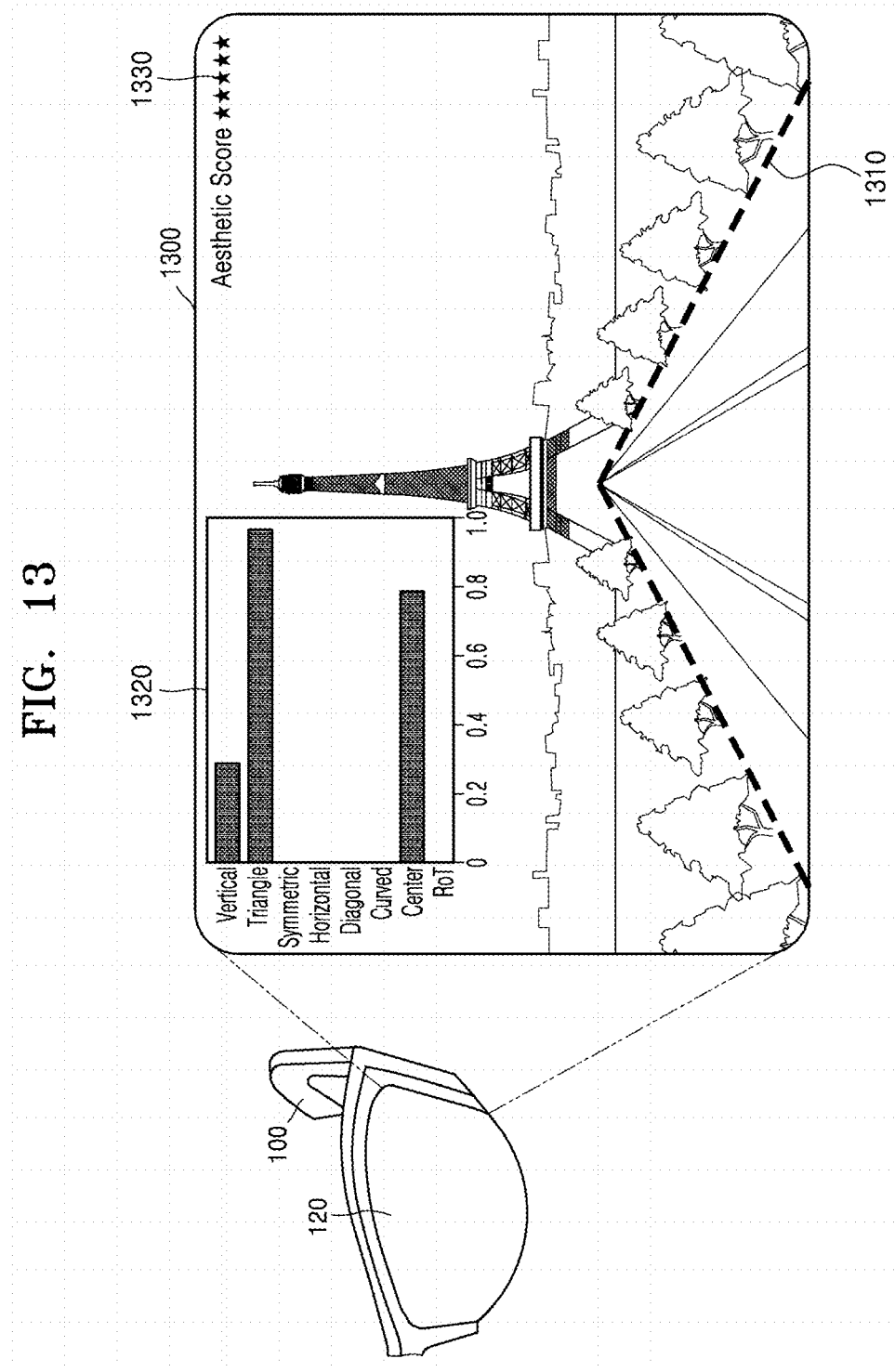
FIG. 13 illustrates an example in which a device displays a user interface (UI) about composition and aesthetic properties on a obtained photo according to an embodiment.

FIG. 13 illustrates an example in which a device displays user interfaces (UI) about composition and aesthetic properties on a obtained photo according to an embodiment.

Referring to FIG. 13, the device 100 may be a wearable device such as smart glass. The device 100 may display an expert-level photo 1300 captured through a camera and obtained by image processing that enhances composition and aesthetic properties on a display module 120.

In an embodiment, the display module 120 may display a first UI 1310 that displays a composition guideline by dashed lines, a second UI 1320 that displays a histogram of composition types, and a third UI 1330 that displays an aesthetic prediction score, to be overlaid on the expert-level photo 1300.

The first UI 1310 is a graphical user interface (GUI) related to a composition guideline, which may be displayed in dashed lines based on placement of dots, lines, or planes of a main object on the photo 1300. The device may recognize a type of the composition and display the guideline based on the recognized type of the composition on the photo 1300. The device may recognize, for example, one of the Rules Of the Third, Symmetric, Triangle, Center, Horizontal, Vertical, Curved, Diagonal, and Pattern compositions, and overlay the guideline of the recognized composition on the photo 1300.

In the embodiment shown in FIG. 13, the photo 1300 is recognized as having the Triangle composition, so the guideline of the Triangle composition may be overlaid on the photo 1300.

The second UI 1320 may be a graphic interface that displays a histogram of composition types. The device 100 may use an obtained network model to recognize a type of the composition of the photo 1300, and obtain the histogram information about the recognized composition type. In the second UI 1320, a composition type having a histogram value closely approximate to 1.0 may be recognized as the composition of the photo 1300. In the example embodiment as shown in FIG. 13, a value of the triangle composition in the second UI 1320 most closely approximates 1.0, so the photo 1300 may be recognized to be in the triangle composition.

The third UI 1330 may be a UI representing an aesthetic estimation score of the photo 1300, which is predicted using the obtained network model. Although the third UI 1330 shown in FIG. 13 represents the aesthetic prediction score by the number of stars, it is an example of a GUI and not limited thereto. In an embodiment, the third UI 1330 may represent the aesthetic prediction score in various types of GUIs, such as numbers, letters, symbols, graphs, etc.

In the embodiment shown in FIG. 13, the device 100 allows the user to visually grasp the composition guideline, the recognized composition types, and the aesthetic prediction score at a glance with the expert-level photo 1300 through the display 120, thereby increasing intuitive properties and user convenience.

Figure 14A:
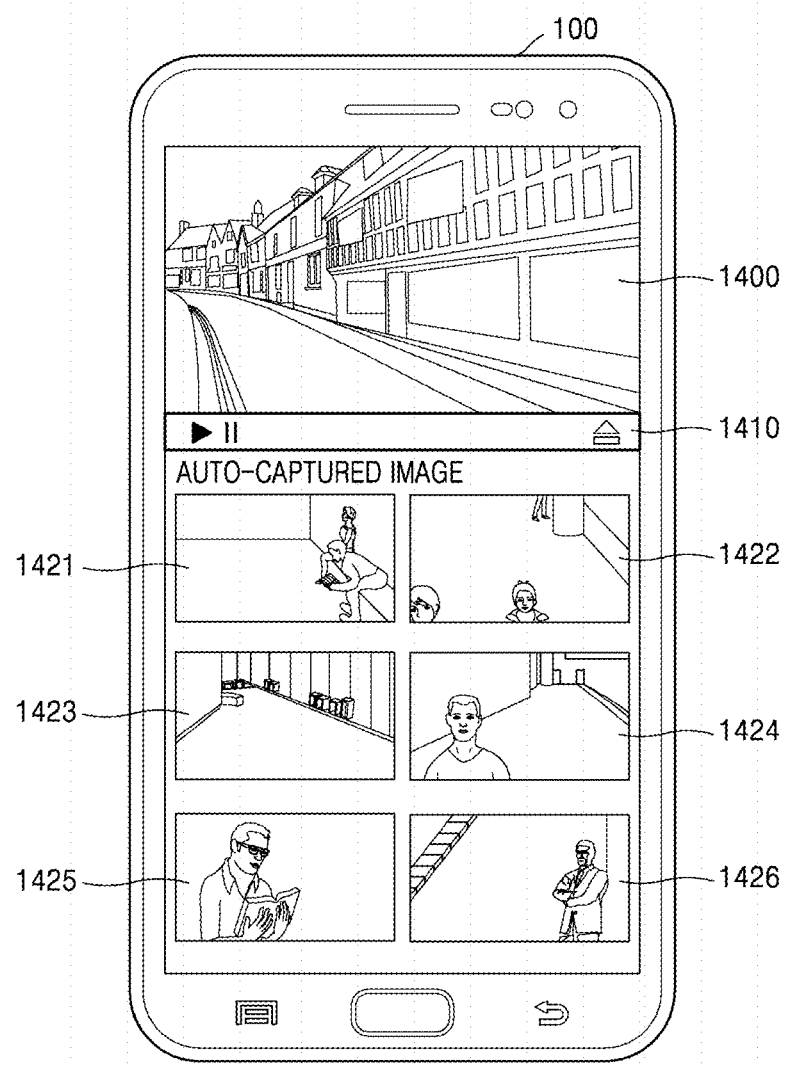
FIG. 14A illustrates an example of a UI that displays photos obtained by a device according to an embodiment.

FIG. 14A illustrates an example of a UI that displays photos obtained by the device 100 according to an embodiment of the disclosure.

Referring to FIG. 14A, the device 100 may detect at least one image frame from a preview image 1400 obtained by capturing a subject through a camera, and obtain a plurality of photos 1421 to 1426 by enhancing compositions and aesthetic properties of the at least one image frame. The preview image 1400 may be composed of a video including a plurality of image frames obtained by capturing for a preset time interval.

In an embodiment, the device 100 may display the preview image 1400 on the display module, and display a UI 1410 to control playing of the preview image 1400 underneath the preview image 1400. The UI 1410 may include virtual buttons to perform functions of playing the video composed of the preview image 1400, stopping the video of the preview image 1400, and loading the preview image 1400. The UI 1410 may be implemented in a GUI.

Figure 14B:
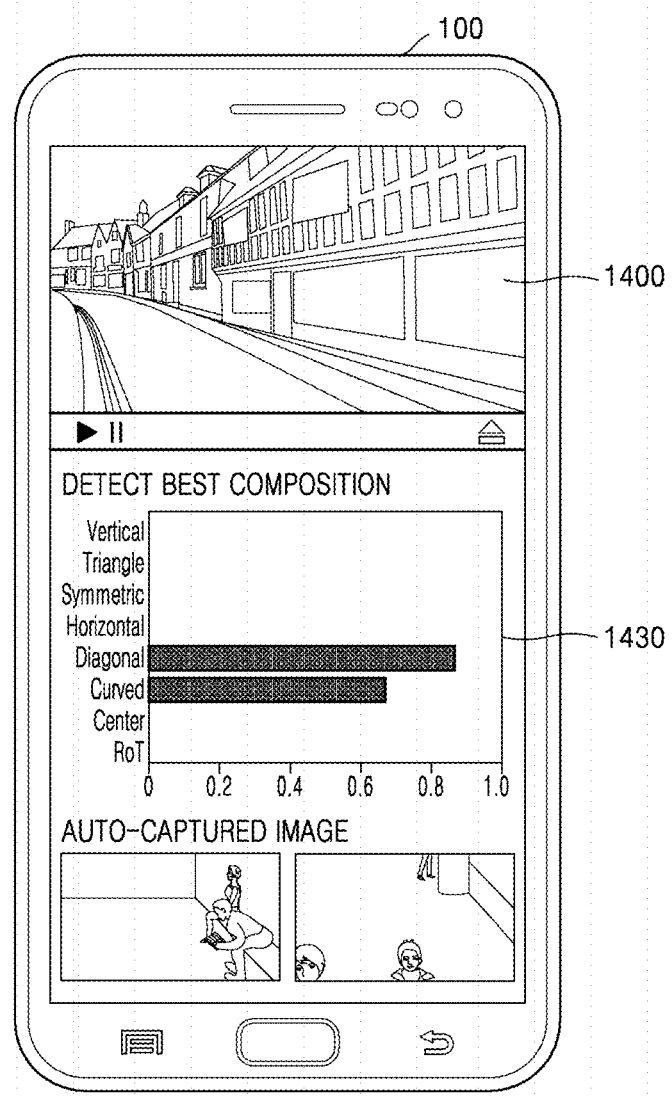
FIG. 14B illustrates an example of a UI that displays photos obtained by a device according to an embodiment.

FIG. 14B illustrates an example of a UI that displays photos obtained by the device 100 according to an embodiment of the disclosure.

Referring to FIG. 14B, the device 100 may play the preview image 1400, and display a UI 1430 that represents histogram information about composition types by analyzing compositions of the played preview image 1400. In an embodiment, the device 100 may analyze composition of image frames played in the preview image 1400 by using a network model obtained in advance. The device 100 may display the user interface 1400 representing a histogram of composition types based on the composition analysis results of the image frames.

Figure 14C:
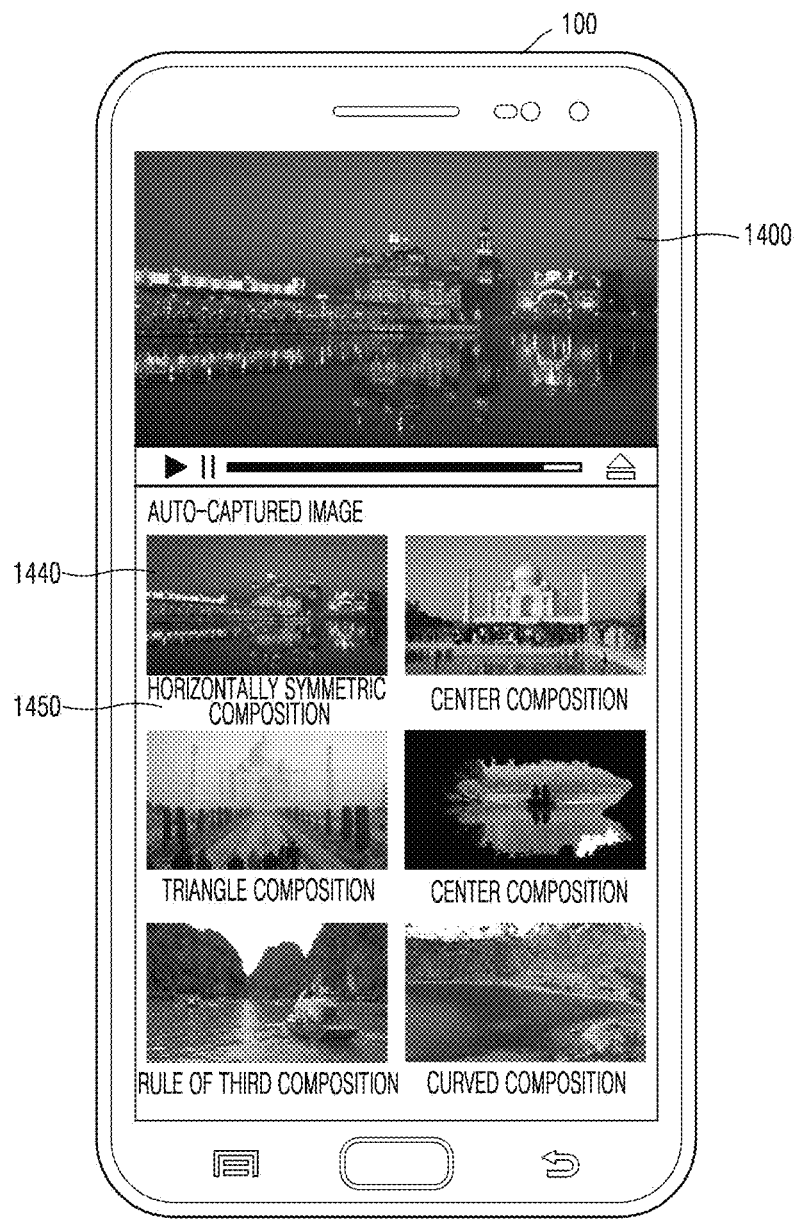
FIG. 14C illustrates an example of a UI that displays photos obtained by a device according to an embodiment.

FIG. 14C illustrates an example of a UI that displays photos obtained by the device 100 according to an embodiment of the disclosure.

Referring to FIG. 14C, the device 100 may recognize composition of a plurality of photos obtained from the preview image 1400, and display a UI 1450 representing the recognized composition types in letters. In the example embodiment shown in FIG. 14C, the device 100 may recognize a composition type of a first photo 1440 as horizontally symmetric composition, and display a UI 1450 representing the composition type 'horizontally symmetric composition' in letters.

In an embodiment, when receiving a user input of selecting one of the plurality of photos, the device 100 may recognize composition of the photo selected by the user input and display a guideline based on the recognized composition type. This will be described in detail in connection with FIG. 14D.

Figure 14D:
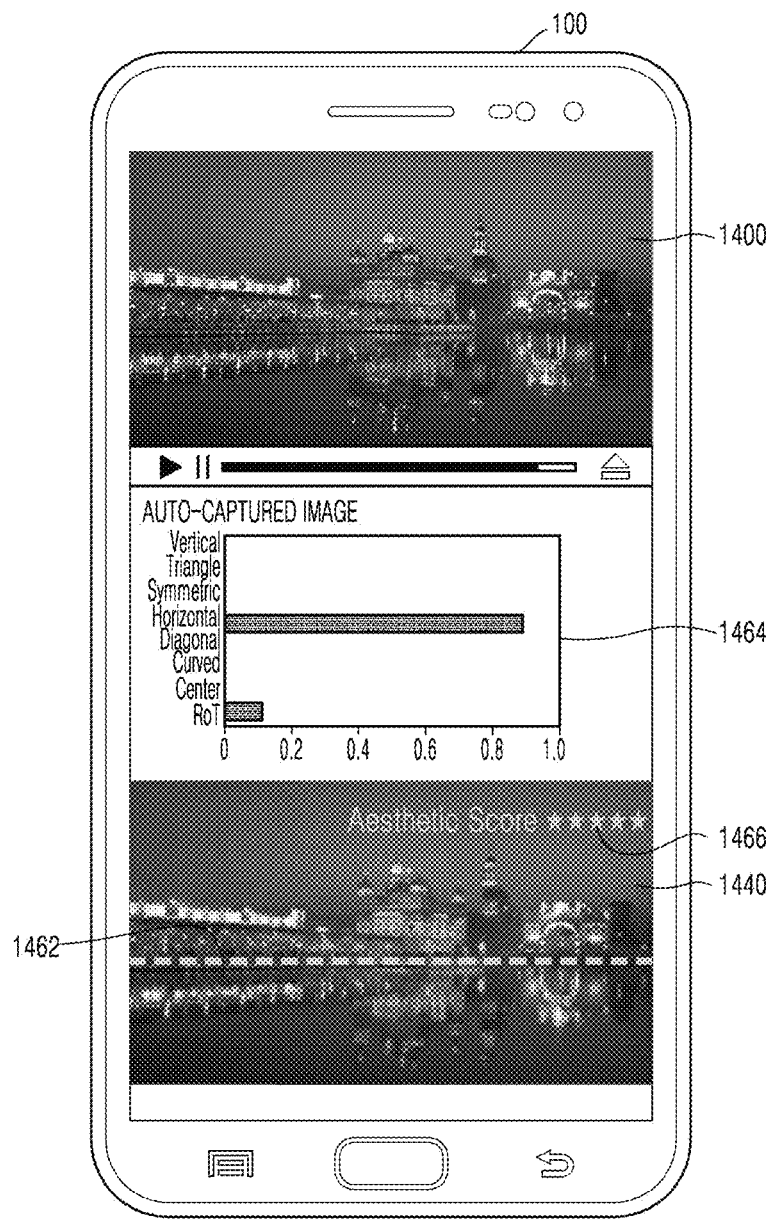
FIG. 14D illustrates an example of a UI on which a device displays a photo selected by a user input according to an embodiment.

FIG. 14D illustrates an example of a UI on which the device 100 displays the first photo 1440 selected by the user input according to an embodiment.

Referring to FIG. 14D, the device 100 may enlarge and display the first photo 1440 when receiving the user input of selecting the first photo 1440 from among a plurality of automatically captured photos. The device 100 may recognize a composition type of the first photo 1440. In an embodiment, the device 100 may display a first UI 1462 representing a guideline in a dotted line based on the recognized composition type by overlaying the first UI 1462 on the first photo 1440. The first UI 1462 is a GUI related to a composition guideline, which may be displayed in a dotted line based on placement of dots, lines, or planes of a main object on the first photo 1440.

The device may recognize at least one of Rule Of Third, Symmetric, Triangle, Center, Horizontal, Vertical, Curved, Diagonal, and Pattern compositions, and overlay the guideline of the recognized composition on the photo 1300. In the embodiment shown in FIG. 14D, the device 100 may recognize that the first photo 1440 has Horizontal composition, and display the first UI 1462, which is the guideline of the Horizontal composition, by overlaying the first UI 1462 on the first photo 1440.

The device 100 may display a second UI 1464, which is a graphic interface that represents a histogram of composition types. The device 100 may use an obtained network model to recognize a type of the composition of the first photo 1440, and obtain the histogram information about the recognized composition type. In the second UI 1464, a composition type having a histogram value that closely approximates 1.0 may be recognized as the composition of the first photo 1440. In the embodiment shown in FIG. 14D, a value of the horizontal composition in the second UI 1464 most closely approximates 1.0, so the first photo 1440 may be recognized to be in the Horizontal composition The device 100 may display a third UI 1466 indicating an aesthetic estimation score by overlaying the third UI 1466 on the first photo 1440. In an embodiment, the device 100 may predict the aesthetic estimation score of the first photo 1440 using an obtained network model, and display the third UI 1464, which is a UI that represents the predicted aesthetic estimation score. Although the third UI 1466 shown in FIG. 14D represents the aesthetic prediction score by the number of stars, it is only an example of a GUI and is not limited thereto. In an embodiment, the third UI 1466 may represent the aesthetic prediction score in various types of GUIs, such as numbers, letters, symbols, graphs, etc.

Figure 15:
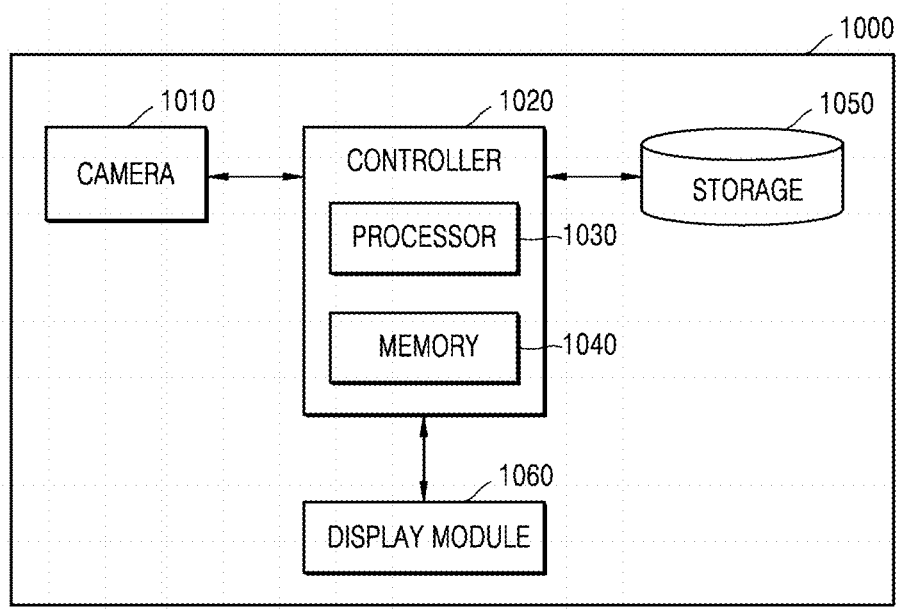
FIG. 15 is a block diagram illustrating components of a device according to an embodiment.

FIG. 15 is a block diagram illustrating components of a device 1000 according to an embodiment of the disclosure. The device shown in FIG. 15 may be the same as the device 100 as described in connection with FIGS. 1 to 14 of the disclosure. The device 1000 may be a wearable device such as smart glass, but is not limited thereto. The device 1000 may include, for example, at least one of a smartphone, a tablet personal computer (tablet PC), a mobile phone, a video phone, an action cam, a wearable cam, and a robot.

The device 1000 may include a camera 1010, a controller 1020, a storage 1050, and a display 1060.

The camera 1010 may include a lens for capturing a subject, and one or more sensors (e.g., a front sensor or a rear sensor), an image sensor, or a flash (e.g., an LED or a xenon lamp). A preview image captured by the image sensor may be processed by the controller 1020 or an extra image processor. In an embodiment, the camera 1010 may obtain the preview image including a plurality of image frames by sequentially capturing the subject for a preset time interval.

The controller 1020 may include a processor 1030 and a memory 1040. The processor 1030 may execute one or more instructions of a program stored in the memory 1040. The processor 1030 may include hardware components for performing arithmetic, logical, and input/output operations and signal processing.

The processor 1030 may include at least one hardware of central processing units (CPUs), microprocessors, graphic processing units (GPUs), application specific integrated circuits (ASIC), digital signal processors (DSPs), digital signal processing devices (DSPDs, programmable logic devices (PLDs), and field programmable gate arrays (FPGAs), without being limited thereto.

In the following embodiments, functions and/or operations performed by the processor 1030 may be implemented by executing instructions received according to computer program codes stored in a recording device such as the memory 1040.

The processor 1030 may detect, from a preview image captured by the camera 1010, at least one image frame where a preset main object or an action of the main object is recognized, and automatically obtain a photo or video of a certain moment from the at least one detected image frame through image processing using an AI model. The processor 1030 may store the obtained photo or video in the storage 1050.

In an embodiment, the processor 1030 may perform image pre-processing tasks such as blur reduction, noise cancellation, image stabilization, or shake removal on the plurality of image frames in the preview image.

In an embodiment, the processor 1030 may control the camera 1010 to start capturing the preview image at a point in time when the camera 1010 recognizes the main object or an action of the main object in the subject. The processor 1030 may obtain a plurality of image frames by capturing the subject for a preset time interval from the point in time to start capturing.

In an embodiment, the device 1000 may further include a user input module for receiving a user input to set the point in time to start capturing, such as a capture button or a start capture GUI. The processor 1030 may set the point in time to start capturing the preview image based on a user input received through the user input module, e.g., an input pressing the capture button, and obtain a plurality of image frames by capturing the subject for the preset time interval from the point in time to start capturing.

In an embodiment, the processor 1030 may determine composition types of at least one image frame in the preview image, in which the main object or an action of the main object is detected. The processor 1030 may determine the composition type of the at least one image frame by using a first neural network model obtained by performing training based on a first DNN with a plurality of photos as input and label values of composition types as output. The processor 1030 may include an AI learning module that performs training based on a DNN such as a CNN or an RNN, and obtain the first neural network model by learning the composition types of the plurality of photos using the AI learning module. However, the one or more embodiments are not limited thereto, and the processor 1030 may perform training based on an algorithm such as SVM, linear regression, logistic regression, Naive Bayes classification, decision tree, k-nearest neighbor algorithm, etc. The first neural network model may be obtained before the at least one image frame is obtained. The first neural network model may be trained by a server. In an embodiment, the device 1000 may further include a communication module, and the device 1000 may obtain the first neural network model trained by the server through the communication module.

In an embodiment, the processor 1030 may obtain a cropped image frame by cropping a region containing the main object from the at least one frame based on placement of objects in the recognized composition type.

In an embodiment, the processor 1030 may predict an aesthetic estimation score of the cropped image frame. In an embodiment, the processor 1030 may predict the aesthetic estimation score of the cropped image frame by using a second neural network model obtained by performing training through a second DNN with a plurality of photos as input and normalized values of aesthetic scores estimated for the plurality of photos as output. In an embodiment, the processor 1030 may train a known DNN model such as a CNN model or an RNN model by entering an AVA data set, which is data of aesthetic scores for each of about 250 thousand photos estimated by 200 estimators. The second neural network model may be trained by a server. In an embodiment, the device 1000 may further include a communication module, and the device 1000 may obtain the second neural network model trained by the server through the communication module.

The processor 1030 may predict an aesthetic estimation score of the cropped image frame by entering the cropped image frame to the second neural network model.

In an embodiment, when the aesthetic estimation score is predicted to be lower than a reference value, the processor 1030 may obtain an aesthetically enhanced expert-level photo by adjusting at least one of image quality parameters including brightness, definition, chroma, contrast, or HDR of the cropped image frame. In an embodiment, the processor 1030 may adjust the image quality parameter of the cropped image frame by using a third neural network model obtained by training a model parameter that indicates a loss between an original photo and the aesthetically enhanced photo, and obtain an aesthetically enhanced expert-level photo. In an embodiment, the processor 1030 may obtain the loss parameter between the original photo and the aesthetically enhanced photo, and predict a degree of distortion of the cropped image frame from the loss parameter by training with a third DNN. In an embodiment, the processor 1030 may calculate an inverse distortion parameter of the parameter that indicates the degree of distortion, and apply the calculated inverse distortion parameter to the cropped image frame to obtain an expert-level photo with the image quality parameter adjusted.

In an embodiment, the processor 1030 may detect an action of a main object from at least one image frame in the preview image, analyze a degree to which the recognized action of the main object matches a preset action category, and predict a highlight estimation score of the at least one image frame. In an embodiment, the processor 1030 may obtain a network model through training using a DNN with numerous images containing main actions of predefined objects (e.g., smiling, dancing, running, eating, kissing, exercising, staring, etc.), as input and label values of action categories as output, and analyze an action of the main object in the at least one image frame using the obtained network model. The processor 1030 may perform training using a DNN such as a CNN or an RNN, and obtain a network model. It is not, however, limited thereto, and the processor 1030 may perform training based on an algorithm such as SVM, linear regression, logistic regression, Naive Bayes classification, decision tree, k-nearest neighbor algorithm, etc. In an embodiment, training on actions of main objects may be performed by a server instead of the processor 1030. In an embodiment, the device 1000 may further include a communication module, and the device 1000 may obtain the second neural network model trained by the server through the communication module.

In an embodiment, the processor 1030 may determine a frame number or a time interval of an image frame having a highlight estimation score equal to or greater than a reference value, and obtain a short-clip video using at least one image frame corresponding to the determined frame number or time interval.

The memory 1040 may store a program including one or more instructions. The memory 1040 may include a hardware device of a flash memory type, or at least one type of a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The storage 1050 may store a photo or a video obtained by the processor 1030. The storage 1050 may include a storage medium of e.g., a flash type, a hard disk type, a multimedia card micro type, a card type memory (e.g., SD or XD memory), and at least one type of magnetic memory, magnetic disc, and optical disc, without being limited thereto.

The display 1060 may display the preview image or display the obtained photo or video under the control of the processor 1030. The display 1060 may display a thumbnail image of the expert-level photo or short-clip image obtained by the processor 1030.

The display 1060 may include a physical device including at least one of e.g., a liquid crystal display (LCD), a plasma display panel (PDP) display, an organic light emitting diode (OLED) display, a field emission display (FED), an LED display, a vacuum fluorescent display (VFD), a digital light processing (DLP) display, a flat panel display, a three dimensional (3D) display, and a transparent display, without being limited thereto. In an embodiment, when the device 1000 is smart glass, the display 1060 may be integrated with the lens part of the glass to display AR related images. In an embodiment, the display 1060 may include a touch screen having a touch interface.

Figure 16:
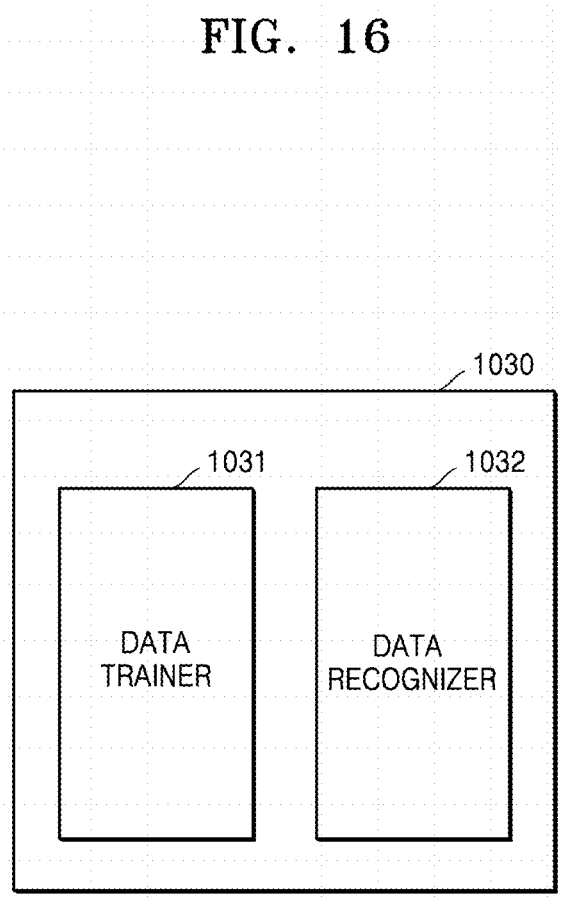
FIG. 16 is a block diagram of a processor according to an embodiment.

FIG. 16 is a block diagram of the processor 1030, according to an embodiment of the disclosure.

Referring to FIG. 16, the processor 1030 may include a data trainer 1030 and a data recognizer 1032.

The data trainer 1031 may train references for analyzing image frames. Herein, 'analyzing image frames' may encompass concepts of learning-based recognition, analysis, or prediction in the disclosure, such as recognizing a main object or an action of the main object from an image frame, recognizing a composition type of the image frame, or predicting an aesthetic estimation score of the image frame. The data trainer 1031 may train references related to which data is to be used for analyzing an image frame and how to analyze the image frame using the data. The data trainer 1031 may obtain data to be used in training and apply the obtained data to a data recognition model to train the references for analyzing an image frame. A detailed description of training the references will be described later.

The data recognizer 1032 may analyze an image frame based on the data. The data recognizer 1032 may use a trained data recognition model, to perform a recognition procedure such as recognizing a main object or an action of the main object from certain image data, recognizing a composition type, predicting an aesthetic estimation score, or the like. The data recognizer 1032 may perform image analysis based on certain data by obtaining the certain data based on a reference preset by training, and using a data recognition model having the obtained data as an input value. Furthermore, a resultant value output by the data recognition model with the obtained data as the input value may be used to update the data recognition model.

At least one of the data trainer 1031 and the data recognizer 1032 may be manufactured into the form of at least one hardware chip and mounted in an electronic device. For example, the at least one of the data trainer 1031 and the data recognizer 1032 may be manufactured into the form of a dedicated hardware chip for AI or manufactured as a portion of the existing universal processor (e.g., a CPU or an AP) or graphic dedicated processor (e.g., a GPU) and mounted in the device 1000.

The data trainer 1031 and the data recognizer 1032 may be mounted in the single device 1000, or in separate devices. For example, one of the data trainer 1031 and the data recognizer 1032 may be included in the device 1000 and the other is included in a server. Furthermore, the data trainer 1031 and the data recognizer 1032 may be connected in a wired or wireless manner, so that a network model parameter built by the data trainer 1031 may be provided to the data recognizer 1032 and data input to the data recognizer 1032 may be provided to the data trainer 1031 as additional training data.

At least one of the data trainer 1031 and the data recognizer 1032 may be implemented in a software module. In the case that the at least one of the data trainer 1031 and the data recognizer 1032 is implemented in a software module (or a program module including instructions), the software module may be stored in a non-transitory computer-readable medium. Furthermore, in this case, the at least one software module may be provided by an operating system (OS) or a certain application. Alternatively, some of the at least one software module may be provided by the OS and some others may be provided by the certain application.

Figure 17:
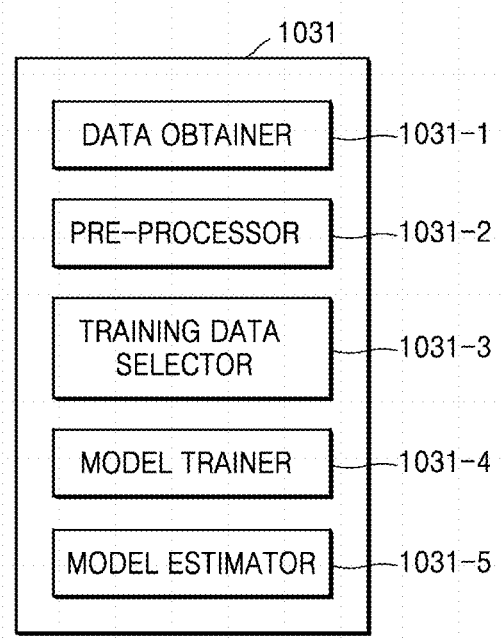
FIG. 17 is a block diagram of a data trainer according to an embodiment.

FIG. 17 is a block diagram of the data trainer 1031, according to an embodiment of the disclosure.

Referring to FIG. 17, the data trainer 1031 may include a data obtainer 1031-1, a pre-processor 1031-2, a training data selector 1031-3, a model trainer 1031-4, and a model estimator 1031-5.

The data obtainer 1031-1 may obtain data required for training. The data obtainer 1031-1 may obtain a plurality of photos or videos. The data obtainer 1031-1 may receive a photo or a video from the camera 1010 of the device 1000 or an external camera that is able to communicate with the device 1000 including the data trainer 1031. The data obtainer 1031-1 may receive a photo or a video from an external server through a communication network.

The pre-processor 1031-2 may pre-process the obtained data so that the obtained data is available for training. The pre-processor 1031-2 may process the obtained data into a preset format so that the model trainer 1031-4, which will be described later, is able to use the obtained data for training. For example, the pre-processor 1031-2 may process a composition type, an aesthetic estimation score, etc., into a label value comprised of a matrix in certain dimensions.

The training data selector 1031-3 may select data for training from among the pre-processed data. The selected data may be provided to the model trainer 1031-4. The training data selector 1031-3 may select data for training from among the pre-processed data based on a preset reference. Alternatively, the training data selector 1031-3 may select data based on the preset reference through training by the model trainer 1031-4, which will be described later.

The model trainer 1031-4 may train references to recognize the composition type based on the training data or predict an aesthetic estimation score.

Furthermore, the model trainer 1031-4 may train a data recognition model using the training data. In this case, the data recognition model may be built in advance.

The data recognition model may be generated taking into account an application area of the recognition model, a purpose of training, computing performance of the device, or the like. The data recognition model may be a model based on e.g., a neural network. For example, a model such as a CNN, a DNN, an RNN, or a bidirectional recurrent deep neural network (BRDNN) may be used for the data recognition model, without being limited thereto.

According to various embodiments, when there are a plurality of data recognition models built in advance, the model trainer 1031-4 may determine a data recognition model having high relevance to input training data and default training data as a data recognition model to be trained. In this case, the default training data may have been classified by data type, and the data recognition model may have been built in advance for each data type. For example, the default training data may have been classified by various references, such as an area where the training data is obtained, a time at which the training data is obtained, a size of the training data, a genre of the training data, a creator of the training data, a type of an object in the training data, etc.

The model trainer 1031-4 may train the data recognition model using a training algorithm including, for example, error back-propagation or gradient descent.

For example, the model trainer 1031-4 may train the data recognition model through supervised learning with an input of training data. The model trainer 1031-4 may train the data recognition model through non-supervised learning that learns types of data without any particular supervision. The model trainer 1031-4 may train the data recognition model through reinforcement learning that uses feedback about whether a result of analyzing an image frame according to the training is correct.

Once the data recognition model is trained, the model trainer 1031-4 may store the trained data recognition model. In this case, the model trainer 1031-4 may store the trained data recognition model in the memory 1040 of the device 1000 (shown in FIG. 15) including the data recognizer 1320. Alternatively, the model trainer 1031-4 may store the trained data recognition model in the memory 1040 of the device 1000 including a data recognizer 1032, which will be described later. Alternatively, the model trainer 1031-4 may store the trained data recognition model in a memory of a server connected to the device 1000 via a wired or wireless network.

In this case, the memory for storing the trained data recognition model may also store instructions or data related to at least one of other components of the device 1000. The memory 1040 may store software and/or a program. The program may include, for example, kernel, middleware, application programming interface (API), and/or application programs (or applications).

The model estimator 1031-5 may input estimation data to the data recognition model, and enable the model trainer 1031-4 to perform training again when a recognition result output from the estimation data fails to satisfy a certain reference. In this case, the estimation data may be preset data for estimating the data recognition model.

For example, when the number of or a portion of the estimation data leading to inaccurate recognition results among recognition results of the trained data recognition model trained for the estimation data, exceeds a preset threshold, the model estimator 1031-5 may estimate that it fails to satisfy the certain reference. For example, when the certain reference is defined as a portion of 2%, and the trained data recognition model outputs wrong recognition results for more than 20 estimation data among a total of 1000 estimation data, the model estimator 1031-5 may estimate that the trained data recognition model is not suitable.

In the meantime, when there are a plurality of data recognition models, the model estimator 1031-5 may estimate whether each of the trained data recognition model satisfies the certain reference, and determine a model satisfying the certain reference as a final data recognition model. In this case, when there are a plurality of models satisfying the certain reference, the model estimator 1031-5 may determine one or a certain number of models set in advance in the order of having higher estimation scores as the final data recognition model.

At least one of the data obtainer 1031-1, the pre-processor 1031-2, the training data selector 1031-3, the model trainer 1031-4, and the model estimator 1031-5 in the data trainer 1031 may be manufactured into a form of at least one hardware chip and mounted in the device 1000. For example, the at least one of the data obtainer 1031-1, the pre-processor 1031-2, the training data selector 1031-3, the model trainer 1031-4, and the model estimator 1031-5 may be manufactured into the form of a dedicated hardware chip for AI or manufactured as a portion of the existing universal processor (e.g., a CPU or an AP) or graphic dedicated processor (e.g., a GPU) and mounted in the aforementioned various devices 1000.

The data obtainer 1031-1, the pre-processor 1031-2, the training data selector 1031-3, the model trainer 1031-4, and the model estimator 1031-5 may be mounted in the single device 1000 or mounted separately in separate devices. For example, some of the data obtainer 1031-1, the pre-processor 1031-2, the training data selector 1031-3, the model trainer 1031-4, and the model estimator 1031-5 may be included in the device 1000 and some others may be included in a server.

At least one of the data obtainer 1031-1, the pre-processor 1031-2, the training data selector 1031-3, the model trainer 1031-4, and the model estimator 1031-5 may be implemented in a software module. In the case that the at least one of the data obtainer 1031-1, the pre-processor 1031-2, the training data selector 1031-3, the model trainer 1031-4, and the model estimator 1031-5 is implemented in the software module (or a program module including instructions), the software module may be stored in a non-transitory computer-readable medium. Furthermore, in this case, the at least one software module may be provided by an operating system (OS) or a certain application. Alternatively, some of the at least one software module may be provided by the OS and some others may be provided by the certain application.

Figure 18:
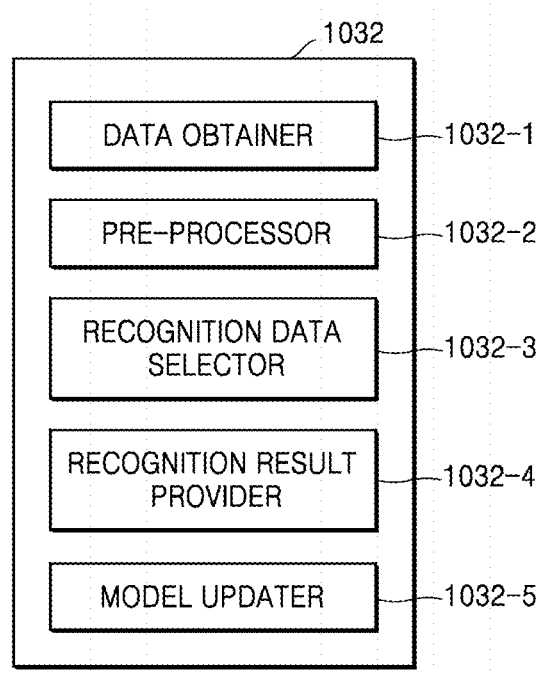
FIG. 18 is a block diagram of a data recognizer according to an embodiment.

FIG. 18 is a block diagram of the data recognizer 1032, according to an embodiment of the disclosure.

Referring to FIG. 18, the data recognizer 1032 may include a data obtainer 1032-1, a pre-processor 1032-2, a recognition data selector 1032-3, a recognition result provider 1032-4, and a model updater 1032-5.

The data obtainer 1032-1 may obtain data for analyzing image frames, and the pre-processor 1032-2 may pre-process the obtained data so that the obtained data is available for analysis of image frames. The pre-processor 1032-2 may process the obtained data into a preset format so that the recognition result provider 1032-4 is able to use the obtained data for analyzing image frames.

The recognition data selector 1032-3 may select data required for analyzing image frames from among the pre-processed data. The selected data may be provided to the recognition result provider 1032-4. The recognition data selector 1032-3 may select some or all of the pre-processed data based on a preset reference. Alternatively, the recognition data selector 1032-3 may select data based on the preset reference through training by the model trainer 1310-4, which will be described later.

The recognition result provider 1032-4 may analyze an image frame by applying the selected data to the data recognition model. The recognition result provider 1032-4 may provide a recognition result according to a data recognition purpose. The recognition result provider 1032-4 may apply the selected data to the data recognition model by using the data selected by the recognition data selector 1032-3 as an input value. The recognition result may be determined by the data recognition model.

The model updater 1032-5 may update the data recognition model based on estimation on the recognition result provided by the recognition result provider 1032-4. For example, the model updater 1032-5 may provide the recognition result provided by the recognition result provider 1032-4 to the model trainer 1031-4 of the data trainer 1031, enabling the model trainer 1031-4 to update the data recognition model.

At least one of the data obtainer 1032-1, the pre-processor 1032-2, the recognition data selector 1032-3, the recognition result provider 1032-4, and the model updater 1032-5 in the data recognizer 1032 may be manufactured into the form of at least one hardware chip and mounted in the device 1000. For example, the at least one of the data obtainer 1032-1, the pre-processor 1032-2, the recognition data selector 1032-3, the recognition result provider 1032-4, and the model updater 1032-5 may be manufactured into the form of a dedicated hardware chip for AI or manufactured as a portion of the existing universal processor (e.g., a CPU or an AP) or graphic dedicated processor (e.g., a GPU) and mounted in the aforementioned various devices 1000.

The data obtainer 1032-1, the pre-processor 1032-2, the recognition data selector 1032-3, the recognition result provider 1032-4, and the model updater 1032-5 may be mounted in the single device 1000 or mounted separately in separate devices. For example, some of the data obtainer 1032-1, the pre-processor 1032-2, the recognition data selector 1032-3, the recognition result provider 1032-4, and the model updater 1032-5 may be included in the device 1000 and some others may be included in a server.

At least one of the data obtainer 1032-1, the pre-processor 1032-2, the recognition data selector 1032-3, the recognition result provider 1032-4, and the model updater 1032-5 may be implemented in a software module. In the case that the at least one of the data obtainer 1032-1, the pre-processor 1032-2, the recognition data selector 1032-3, the recognition result provider 1032-4, and the model updater 1032-5 is implemented in the software module (or a program module including instructions), the software module may be stored in a non-transitory computer-readable medium. Furthermore, in this case, the at least one software module may be provided by an operating system (OS) or a certain application. Alternatively, some of the at least one software module may be provided by the OS and some others may be provided by the certain application.

Figure 19:
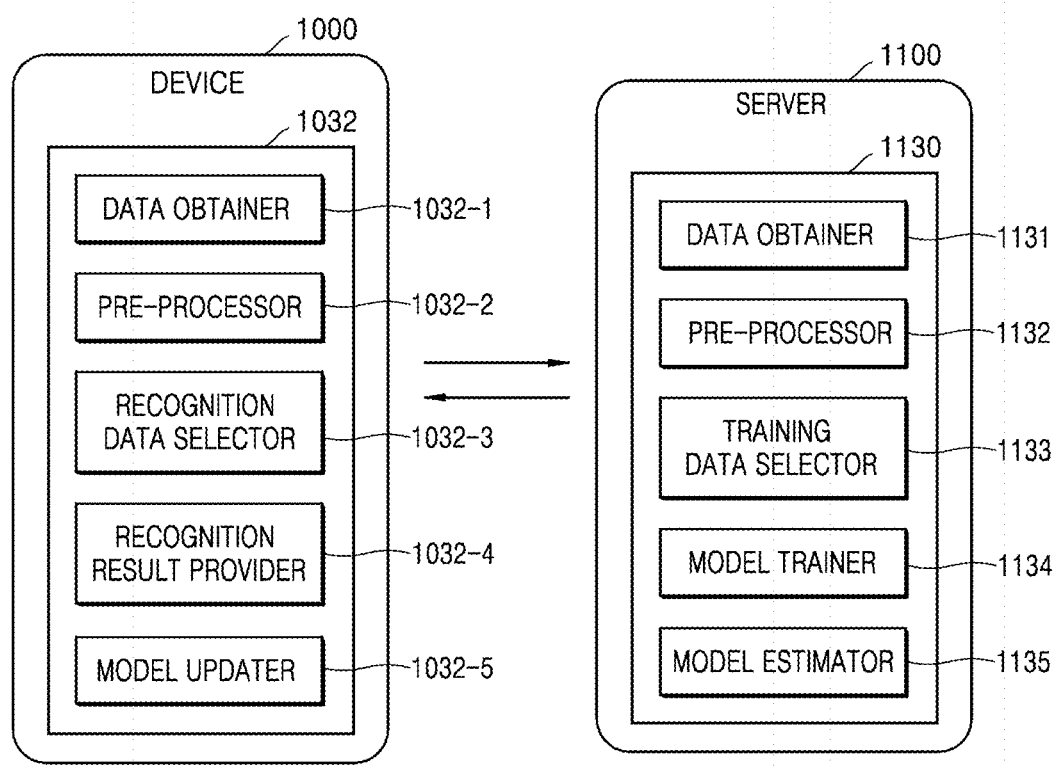
FIG. 19 illustrates an example of a device and a server to train and recognize data according to an embodiment.

FIG. 19 illustrates an example of the device 1000 and a server 1100 to train and recognize data according to an embodiment.

Referring to FIG. 19, the server 1100 may provide a network model obtained by training to the device 1000.

Specifically, a model trainer 1134 of the server 1100 may perform the function of the data trainer 1031 shown in FIG. 16. The model trainer 1134 of the server 1100 may train references related to which data is to be used for analyzing an image frame and how to analyze the image frame using the data. The model trainer 1134 may obtain data to be used for training and apply the obtained data to a data recognition model, which will be described later, to train references for analyzing image frames.

The recognition result provider 1032-4 of the device 1000 may apply data selected by the recognition data selector 1032-3 to the data recognition model obtained by the server 1100 to analyze image frames. For example, the recognition result provider 1032-4 may transmit data selected by the recognition data selector 1032-3 to the server 1100, and request the server 1100 to apply the data selected by the recognition data selector 1032-3 to the recognition model to analyze image frames. The recognition result provider 1032-4 may receive, from the server 1100, various types of information of the image frame analyzed by the server 1100.

Alternatively or additionally, the recognition result provider 1032-4 of the device 1000 may receive the recognition model obtained by the server 1100, and analyze image frames using the received recognition model. In this case, the recognition result provider 1032-4 of the device 1000 may apply data selected by the recognition data selector 1032-3 to the data recognition model received from the server 1100 to analyze image frames.

Figure 20:
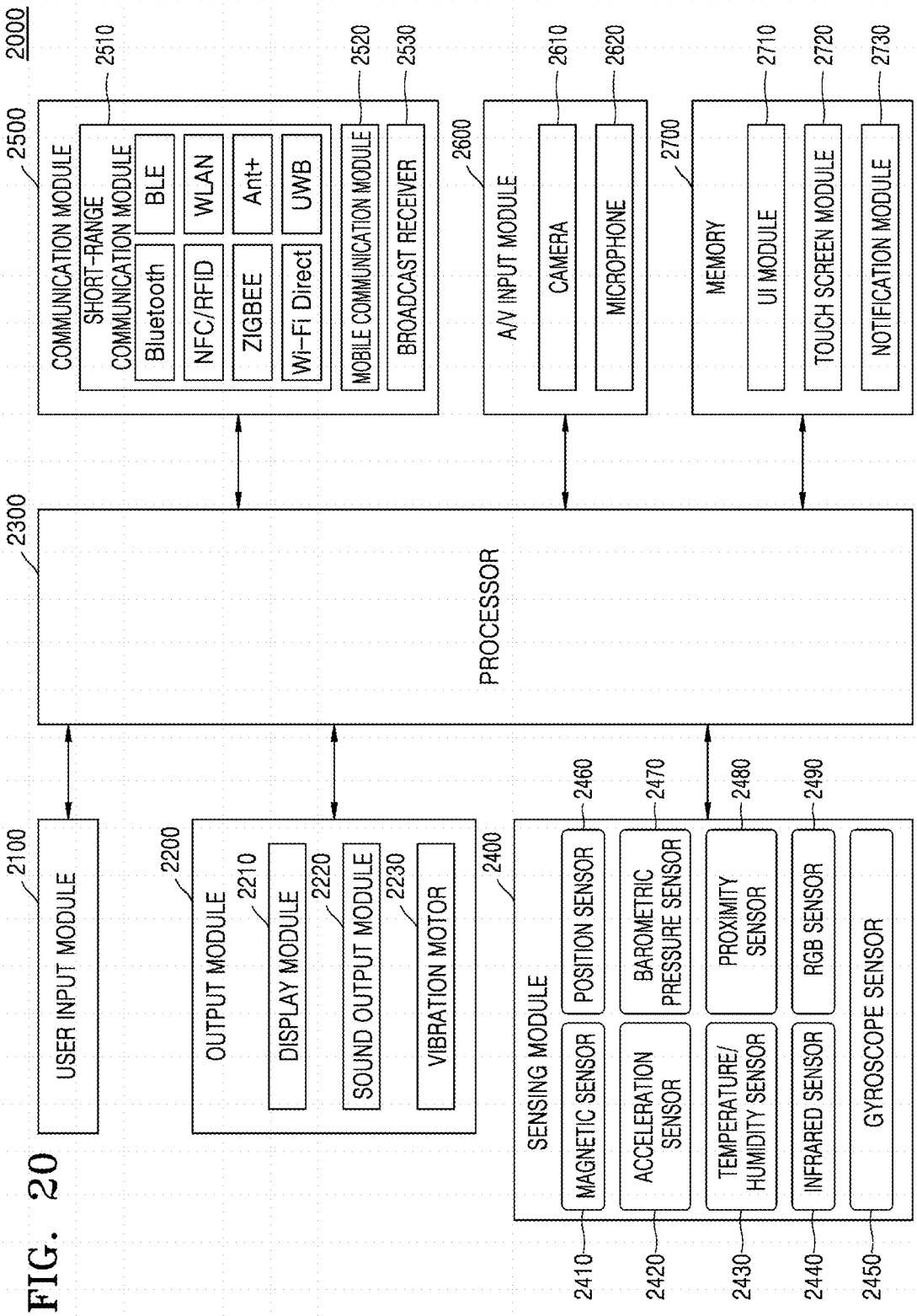
FIG. 20 is a block diagram illustrating components of a device according to an embodiment.

FIG. 20 is a block diagram illustrating components of a device 2000 according to an embodiment of the disclosure.

The device 2000 shown in FIG. 20 may include the same components as the device 100 or 1000 as described in connection with FIGS. 1 to 15 of the disclosure. For example, of the components shown in FIG. 20, a controller 2300 may correspond to the processor 1030 shown in FIG. 15, and a camera 2610 may be the same as the camera 1010 shown in FIG. 15.

The device 2000 shown in FIG. 20 may perform all the operations and functions of the devices 100 and 1000 as described in connection with FIGS. 1 to 15.

Referring to FIG. 20, the device 2000 may include a user input module 2100, an output module 2200, a controller 2300, a sensing module 2400, a communication module 2500, an audio/video (NV) input module 2600, and a memory 2700.

The user input module 2100 refers to a device that allows the user to enter data to control the device 2000. For example, the user input module 2100 may include a keypad, a dome switch, a (capacitive, resistive, infrared detection type, surface acoustic wave type, integral strain gauge type, piezoelectric effect type) touch pad, a jog wheel, a jog switch, etc., without being limited thereto. The user input module 2100 may receive a user input required to obtain interactive information to be provided to the user.

The output module 2200 may include a display module 2210 for outputting a video signal, a sound output module 2220 for outputting an audio signal, and a vibration motor 2230 for outputting a vibration signal.

The vibration motor 2230 may output a vibration signal. For example, the vibration motor 2230 may output a vibration signal corresponding to an output of audio data or video data (e.g., call signal incoming sound, message incoming sound, etc.).

The sensing module 2400 may detect a condition of or around the device 2000 and forward the detected information to the controller 2300.

The sensing module 2400 may include at least one of a magnetic sensor 2410, an acceleration sensor 2420, a temperature/humidity sensor 2430, an infrared sensor 2440, a gyroscope sensor 2450, a positioning sensor (e.g., a global positioning system (GPS)) 2460, a barometric pressure sensor 2470, a proximity sensor 2480, or an RGB sensor (illuminance sensor) 2490, without being limited thereto. Those of ordinary skill in the art may intuitively infer the functions of the respective sensors, so the detailed description thereof will be omitted.

The communication module 2500 may include one or more components enabling wireless communication with other external electronic devices. For example, the communication module 2500 may include a short-range communication module 2510, a mobile communication module 2520, and a broadcast receiver 2530.

The short-range communication module 2510 may include a Bluetooth communication module, a Bluetooth low energy (BLE) communication module, a near field communication (NFC) module, a wireless local area network (WLAN), e.g., Wi-Fi, communication module, a Zigbee communication module, an infrared data association (IrDA) communication module, a Wi-Fi direct (WFD) communication module, an ultra wideband (UWB) communication module, an Ant+ communication module, etc., without being limited thereto.

The mobile communication module 2520 transmits or receives wireless signals to and from at least one of a base station, an external terminal, or a server in a mobile communication network. The RF signal may include a voice call signal, a video call signal or different types of data involved in transmission/reception of a text/multimedia message.

The broadcast receiver 2530 receives broadcast signals and/or broadcasting-related information from the outside on a broadcasting channel. The broadcasting channel may include a satellite channel or a terrestrial channel. Depending on implementations, the device 2000 may not include the broadcast receiver.

The communication module 2500 may transmit to or receive, from a second interactive electronic device, other devices and a server, information for obtaining interactive information to be provided to a first user.

The A/V input module 2600 for inputting audio or video signals may include a camera 2610, a microphone 2620, etc. The camera 2610 may acquire image frames, such as still images or a video through an image sensor in a video call mode or a photography mode. An image captured by the image sensor may be processed by the controller 2300 or an extra image processor.

Image frames processed by the camera 2610 may be stored in the memory 2700, or transmitted to an outside via the communication module 2500. The camera 2610 may be two or more in number depending on configuration of the terminal.

The microphone 2620 may process a sound signal received from the outside into electric voice data. For example, the microphone 2620 may receive sound signals from an external device or a speaker. The microphone 2620 may employ various noise-eliminating algorithms to eliminate noise generated in the course of receiving an external sound signal.

The memory 2700 may store a program for processing and control of the controller 2300, or store data input to or output from the device 2000.

The memory 2700 may include at least one type of storage medium including a flash memory, a hard disk, a multimedia card micro type memory, a card type memory (e.g., SD or XD memory), a RAM, an SRAM, a ROM, an EEPROM, a PROM, a magnetic memory, a magnetic disk, and an optical disk.

Programs stored in the memory 2700 may be classified into a plurality of modules according to the functions, e.g., a user interface (UI) module 2710, a touch screen module 2720, a notification module 2730, etc.

The UI module 2710 may provide a specified UI, a GUI, etc., working with the device 2000 for each application. The touch screen module 2720 may detect a touch gesture of a user over the touch screen and forward information about the touch gesture to the controller 2300. In some embodiments, the touch screen module 2720 may recognize and analyze a touch code. The touch screen module 2720 may include additional hardware including a controller.

The notification module 2730 may generate a signal to notify occurrence of an event of the device 2000. Examples of the event occurred in the device 2000 may include reception of a call, reception of a message, key signal input, schedule notification, etc. The notification module 2730 may output a notification signal in a video signal format through the display module 2210, in an audio signal format through the sound output module 2220, or in a vibration signal format through the vibration motor 2230.

The device 100, 1000, or 2000 as described in the disclosure may be implemented in hardware, software, and/or a combination thereof. For example, the device 100, 1000, or 2000 may be implemented with one or more general purpose computers or special purpose computers such as a processor, an arithmetic logic unit (ALU), an application specific integrated circuit (ASIC), a digital signal processor (DSP), a digital signal processing device (DSPD), a programmable logic device (PLD), a microcomputer, a microprocessor, or any device capable of executing and responding to instructions.

The software may include a computer program, codes, instructions, or one or more combinations of them, and may configure a processing device to operate as desired or instruct the processing device independently or collectively.

The software may be implemented with a computer program including instructions stored in a computer-readable recording (or storage) medium. Examples of the computer-readable recording medium include a magnetic storage medium (e.g., a ROM, a floppy disk, a hard disk, etc.), and an optical recording medium (e.g., a compact disc ROM (CD-ROM), or a digital versatile disc (DVD)). The computer-readable recording medium may also be distributed over network coupled computer systems so that the computer-readable code is stored and executed in a distributed fashion. This media may be read by the computer, stored in the memory, and executed by the processor.

The computer is a device capable of calling out instructions stored in a storage medium and operating under the instructions as in the embodiments of the disclosure, and may include the device 100, 1000, or 2000 according to the embodiments of the disclosure.

The computer-readable storage medium may be provided in the form of a non-transitory storage medium. The term 'non-transitory' may mean that the storage medium is tangible without including a signal, but does not distinguish any data stored semi-permanently or temporarily in the storage medium.

Furthermore, the device 100, 1000, or 2000 according to the embodiments of the disclosure may be included and provided in a computer program product. The computer program product may be a commercial product that may be traded between a seller and a buyer.

The computer program product may include a software program and a computer-readable storage medium having the software program stored thereon. For example, the computer program product may include a product in the form of a software program that is electronically distributed by the manufacturer of the device 100, 1000, or 2000 or by an electronic market (e.g., Google play Store®, or App Store®). For the electronic distribution, at least a portion of the software program may be stored in a storage medium or arbitrarily obtained. In this case, the storage medium may be one of a server of the manufacturer or of a relay server that temporarily stores the software program.

In a system including a server and a user equipment (UE) (e.g., an ultrasonic diagnosis apparatus), the computer program product may include a storage medium of the server or a storage medium of the UE. Alternatively or additionally, when there is a third device (e.g., a smartphone) communicatively connected to the server or the UE, the computer program product may include a storage medium of the third device. In another example, the computer program product may be transmitted from the server to the terminal or the third party, or may include a software program itself that is transmitted from the third device to the terminal.

In this case, one of the server, the terminal, and the third device may execute the computer program product to perform the method according to the embodiments of the disclosure. Alternatively or additionally, two or more of the server, the terminal, and the third device may execute the computer program product to perform the method according to the embodiments of the disclosure in a distributed fashion.

For example, the server (e.g., a cloud server or an artificial intelligence (AI) server) may execute the computer program product stored therein to control the terminal communicatively connected to the server to perform the method according to the embodiments of the disclosure.

In yet another example, the third device may execute the computer program product to control the terminal communicatively connected to the third device to perform the method according to the embodiments of the disclosure.

In the case that the third device executes the computer program product, the third device may download the computer program product and execute the downloaded computer program product. Alternatively, the third device may execute the computer program product that is preloaded to perform the method according to the embodiments of the disclosure.

Although the embodiments of the disclosure are described above, the disclosure is not limited to the aforementioned embodiments, but may, of course, be practiced in various modifications without departing from the scope of the disclosure claimed as in the appended claims, and the modifications should not be understood separately from technical ideas or prospects of the disclosure.

Although the disclosure is described with reference to some embodiments as described above and the accompanying drawings, it will be apparent to those of ordinary skill in the art that various modifications and changes can be made to the embodiments. For example, the aforementioned method may be performed in a different order, and/or the aforementioned electronic devices, structures, circuits, etc., may be combined in different combinations from what is described above, and/or replaced or substituted by other components or equivalents thereof.

What is claimed is:

1. A method of automatically obtaining a photo of a moment, the method comprising:
    obtaining a plurality of image frames sequentially captured through a camera for a preset time interval;
    detecting at least one image frame among the plurality of image frames in which a main object corresponding to a preset main object or an action of the main object corresponding to a preset action is recognized;
    determining a type of composition of the at least one image frame;
    cropping a region including the main object from the at least one image frame based on placement of objects in the determined type of composition;
    predicting an aesthetic estimation score of a cropped image frame including the cropped region by inputting the cropped image frame into a first deep neural network model;
    adjusting at least one of image quality parameters of the cropped image frame based on the predicted aesthetic estimation score; and
    obtaining the photo using the cropped image frame of which the at least one of the image quality parameters is adjusted.

2. The method of claim 1, wherein the obtaining the photo comprises:
    adjusting the at least one of the image quality parameters including brightness, definition, chroma, contrast, or high dynamic range (HDR) of the cropped image frame.

3. The method of claim 1, wherein the determining the type of composition of the at least one image frame comprises determining the type of composition of the at least one image frame by using a second deep neural network model obtained by training the second deep neural network model with an input of a plurality of photos to output label values of types of composition.

4. The method of claim 1, wherein the first deep neural network model is trained with a plurality of photos as an input and normalized values of aesthetic scores estimated in advance for the plurality of photos as an output.

5. The method of claim 2, wherein the adjusting at least one of the image quality parameters of the cropped image frame by using a third deep neural network model obtained by training a model parameter which indicates a loss between an original photo and the image frame.

6. The method of claim 1, further comprising displaying the obtained photo,
    wherein the display of the photo comprises displaying at least one user interface of a guideline of a composition, a histogram of types of composition, or an aesthetic prediction score by overlaying the at least one user interface on the photo.

7. A device for automatically obtaining a photo of a moment, the device comprising:
    a camera configured to sequentially capture a plurality of image frames of a subject for a preset time interval;
    a storage storing the plurality of image frames;
    a memory storing a program including one or more instructions; and
    a processor configured to execute the one or more instructions of the program stored in the memory to:
        detect at least one image frame among the plurality of image frames in which a main object corresponding to a preset main object or an action of the main object corresponding to a preset action is recognized;
        determine a type of composition of the at least one image frame;
        crop a region including the main object from the at least one image frame based on placement of objects in the determined type of composition;
        predict an aesthetic estimation score of a cropped image frame including the cropped region by inputting the cropped image frame into a first deep neural network model;
        adjust at least one of image quality parameters of the cropped image frame based on the predicted aesthetic estimation score;
        obtain the photo using the cropped image frame of which the at least one of the image quality parameters is adjusted; and
        store the obtained photo in the storage.

8. The device of claim 7, wherein the processor is further configured to adjust the at least one of the image quality parameters including brightness, definition, chroma, contrast, or high dynamic range (HDR) of the cropped image frame.

9. The device of claim 7, wherein the processor is further configured to determine the type of composition of the at least one image frame by using a second deep neural network model obtained by training through the second deep neural network model with an input of a plurality of photos to output label values of types of composition.

10. The device of claim 9, wherein the first deep neural network model is trained with a plurality of photos as an input and normalized values of aesthetic scores estimated in advance for the plurality of photos as an output.

11. The device of claim 8, wherein the processor is further configured to adjust the at least one of the image quality parameters of the cropped image frame by using a third deep neural network model obtained by training a model parameter which indicates a loss between an original photo and the adjusted image frame.

12. The device of claim 7, further comprising a display configured to display the obtained photo,
wherein the processor is further configured to control the display to display at least one user interface of a guideline of a composition, a histogram of types of composition, or an aesthetic prediction score by overlaying the at least one user interface on the photo.

13. A non-transitory computer-readable storage medium storing a computer program, the computer program, when executed by a processor, causes the processor to:

obtain a plurality of image frames sequentially captured through a camera for a preset time interval;

detect at least one image frame among the plurality of image frames in which a main object corresponding to a preset main object or an action of the main object corresponding to a preset action is recognized;

determine a type of composition of the at least one image frame;

crop a region including the main object from the at least one image frame based on placement of objects in the at least one image frame and the determined type of composition;

predict an aesthetic estimation score of a cropped image frame including the cropped region by inputting the cropped image frame into a deep neural network model;

adjust at least one of image quality parameters of the cropped image frame based on the predicted aesthetic estimation score; and obtain a photo using the cropped image frame of which the at least one of the image quality parameters is adjusted.

* * * * *